United States Patent
Ribeiro et al.

(10) Patent No.: US 11,226,023 B2
(45) Date of Patent: Jan. 18, 2022

(54) CHAIN CLOSING LINK

(71) Applicant: SRAM Deutschland GmbH, Schweinfurt (DE)

(72) Inventors: Bruno Miguel Ferreira Da Silva Ribeiro, Aveiro (PT); Pedro Miguel Nunes Dos Santos, Coimbra (PT)

(73) Assignee: SRAM Deutschland GmbH, Schweinfurt (DE)

( * ) Notice: Subject to any disclaimer, the term of this patent is extended or adjusted under 35 U.S.C. 154(b) by 298 days.

(21) Appl. No.: 15/666,102

(22) Filed: Aug. 1, 2017

(65) Prior Publication Data

US 2018/0031077 A1 Feb. 1, 2018

(30) Foreign Application Priority Data

Aug. 1, 2016 (DE) .......................... 202016004662.5
Jul. 12, 2017 (DE) .......................... 102017006618.3

(51) Int. Cl.
*F16G 15/04* (2006.01)
*F16G 13/06* (2006.01)
*F16G 13/02* (2006.01)
*B62K 3/00* (2006.01)

(52) U.S. Cl.
CPC .............. *F16G 15/04* (2013.01); *F16G 13/02* (2013.01); *F16G 13/06* (2013.01); *B62K 3/00* (2013.01)

(58) Field of Classification Search
CPC .......... F16G 15/04; F16G 13/02; F16G 13/06; F16G 15/00; F16G 15/02; B62K 3/00
USPC ........................................................ 474/219
See application file for complete search history.

(56) References Cited

U.S. PATENT DOCUMENTS

| | | |
|---|---|---|
| 283,653 A | 8/1883 | Paxson |
| 600,595 A | 3/1898 | Pond |
| 610,583 A | 9/1898 | Fox |
| 623,431 A | 4/1899 | Schaefer |
| 697,163 A | 4/1902 | Painter |
| 717,975 A | 1/1903 | Dodge |
| 745,975 A | 12/1903 | Sweany |
| 762,046 A | 6/1904 | Gates |
| 847,235 A | 3/1907 | Butler |
| 959,047 A | 5/1910 | Belcher |
| 1,098,870 A | 6/1914 | Kates |
| 1,127,684 A | 2/1915 | Seeberger |
| 5,362,282 A | 11/1994 | Lickton |
| 7,712,298 B1 | 5/2010 | Wang |
| 7,914,410 B2 | 3/2011 | Oishi et al. |
| 8,540,597 B2 * | 9/2013 | Wang ..................... F16G 13/06 403/118 |
| 9,494,216 B2 * | 11/2016 | Fukumori ............... F16G 13/06 |
| 2001/0046917 A1 | 11/2001 | Linnenbrugger |
| 2007/0197333 A1 * | 8/2007 | Santos .................... F16G 13/06 474/227 |

(Continued)

FOREIGN PATENT DOCUMENTS

| | | |
|---|---|---|
| CN | 105782348 A | 7/2016 |
| DE | 102006005157 | 8/2007 |

(Continued)

*Primary Examiner* — Teresa M Ekiert

(57) ABSTRACT

A chain-closing link for a bicycle chain including two closing parts. Each of the closing parts includes a closing plate having a retaining opening and a displacement region. Each of the closing parts also includes a chain pin. The closing plate includes a recess and/or a hole having a securing region.

19 Claims, 14 Drawing Sheets

(56) References Cited

U.S. PATENT DOCUMENTS

| | | |
|---|---|---|
| 2011/0082195 A1 | 4/2011 | Guy et al. |
| 2013/0150195 A1 | 6/2013 | Christmas et al. |
| 2015/0260258 A1 | 9/2015 | Kubota et al. |
| 2015/0260260 A1 | 9/2015 | Fukumori |
| 2016/0230840 A1 | 4/2016 | Wu |
| 2016/0169324 A1 | 6/2016 | Wu |

FOREIGN PATENT DOCUMENTS

| | | |
|---|---|---|
| DE | 102006005157 A1 | 8/2007 |
| DE | 102015003057 A1 | 9/2015 |
| EP | 1816372 | 8/2007 |
| EP | 2584219 | 4/2013 |
| TW | M504166 U | 7/2015 |

* cited by examiner

CHAIN CLOSING LINK

This application claims priority to, and/or the benefit of, German application DE 20 2016 004 662.5, filed on Aug. 1, 2016 and German application DE 10 2017 006 618.3, filed on Jul. 12, 2017, both of which are referenced herein in their entirety.

BACKGROUND OF THE INVENTION

The present invention relates to a chain-closing link for a drive chain which interacts with a multiple sprocket assembly with a large number of gears on a rear wheel of a bicycle.

Drive chains for bicycles with derailleur gears are made up of chain links which are arranged in a pivotable manner in relation to one another and with the aid of which is formed a closed chain loop for power-transmission purposes. These chain links can be rotated relative to one another up around chain pins, wherein the chain pins are accommodated by holes which are located in the two end regions of each link plate. The two end regions of each link plate are connected to one another by a connecting region of usually tapered outer contour. The chain links comprise either a pair of inner link plates or a pair of outer link plates. The pairs of outer link plates and inner link plates are connected alternately to one another by the chain pins. This arrangement means that the distance between a pair of outer link plates is somewhat larger than that between a pair of inner link plates.

The ends of the chain loop are connected to one another by a chain-closing link. It is possible for the closing link either to be re-closable or to be intended for only single use. The closing link is formed by a pair of outer link plates, which nevertheless has some features different from the conventional pairs of outer link plates.

The prior art discloses various approaches which are intended to prevent undesired detachment of the closing link.

DE 10 2006 005 157, therefore, provides a chain-closing link which has two closing plates with assembly openings (slots) and two pins. For assembly purposes, the pins are introduced into the large end diameter of the assembly openings. It is then necessary for the two pins, in each case in the region of the pin head and in the region of the pin groove, to negotiate a narrowed location in the displacement region of the assembly opening before they latch into the small end diameter of the slot. In its end position, the pin is accommodated, along its groove or its neck, in the small end diameter of the assembly opening. The diameter of the small end diameter of the assembly opening thus corresponds at least to the diameter of the pin neck. In order to facilitate desired opening of the chain-closing link, the transition from the small end diameter in the direction of the narrowed location in the assembly opening allows the chain pin to start moving in a clamping-free manner in the opening direction. This clamping-free region, however, generates a small amount of play between the pin and small end diameter, and this play, in turn, can result in undesired detachment when the chain is subjected to pronounced loading.

It is therefore an object of the invention to provide a chain-closing link which, even in the case of pronounced loading, for example in the case of pronounced vibration or impact on uneven terrain, prevents undesired detachment of the chain-closing link.

SUMMARY

In an embodiment, a chain-closing link for a bicycle chain includes two closing parts. The closing parts include a closing plate having a first end region, a second end region, a connecting region between the two end regions, and a long hole, the long hole comprising an insertion opening, a retaining opening and a displacement region located between the insertion opening and the retaining opening, is arranged in the first end region of the closing plate. The displacement region narrows from the insertion opening in the direction of the retaining opening and forms a narrowed neck location. The closing parts also include a chain pin connected in a rotationally fixed manner to the closing plate, the chain pin having at one end a pin head with a pin neck at one end and has a pin foot at an other end. A diameter of the insertion opening is larger than a diameter of the pin head, a diameter of the retaining opening is smaller than the diameter of the pin head and larger than a diameter of the pin neck, and the narrowed neck location is dimensioned to be smaller than the diameter of the pin neck. A securing region is arranged between the narrowed neck location and the retaining opening of the long hole and is dimensioned to be smaller than the diameter of the pin neck.

In an embodiment, a chain-closing link for a bicycle chain includes two closing parts. The closing parts include a closing plate including a first end region, a second end region, a connecting region between the two end regions, and a long hole arranged in the first end region, the connecting region of the closing plate including a concave peripheral region and a non-concave peripheral region, and the long hole comprising an insertion opening, a retaining opening and a displacement region located between the insertion opening and the retaining opening. The displacement region narrows from the insertion opening in the direction of the retaining opening and forms a narrowed head location and/or a narrowed neck location. The closing parts also include a chain pin connected in a rotationally fixed manner to the closing plate, the chain pin having at one end a pin head with a pin neck and at the other end a pin foot. A diameter of the insertion opening is larger than a diameter of the pin head, a diameter of the retaining opening is smaller than the diameter of the pin head and larger than a diameter of the pin neck, and the narrowed head location is dimensioned to be smaller than the diameter of the pin head and/or the narrowed neck location is dimensioned to be smaller than the diameter of the pin neck. The connecting region of the closing plate has a recess.

BRIEF DESCRIPTION OF DRAWINGS

The present invention will be described in detail with reference to the accompanying drawings, wherein the exemplary embodiments should be considered merely to be non-limiting examples of the chain-closing link according to the invention. In the drawings.

DETAILED DESCRIPTION

Figure 1A:
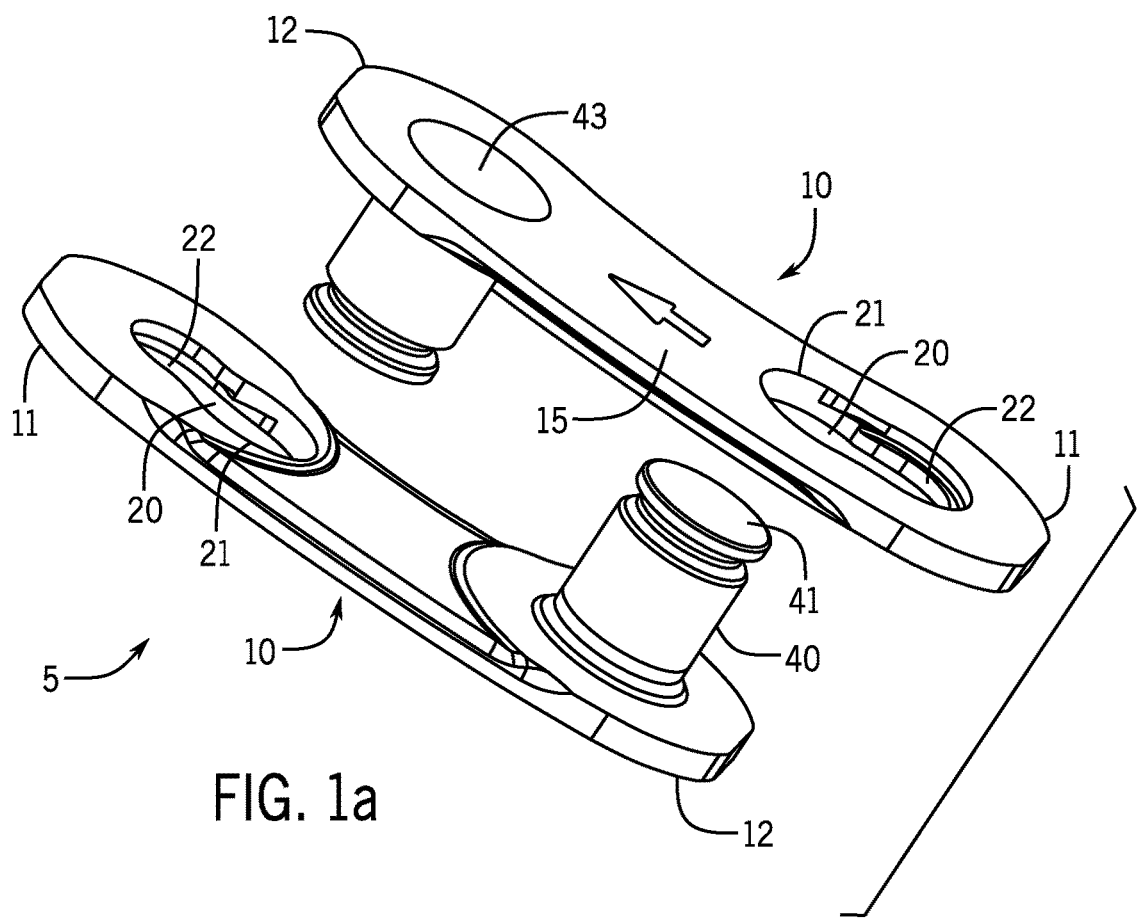
FIG. 1a shows a perspective view of the chain-closing link in the non-assembled state.

The presented embodiments achieve this object by way of a chain-closing link, comprising two closing parts each with a closing plate and a chain pin connected in a rotationally fixed manner to the closing plate. The closing plate has a first end region, a second end region and a connecting region between the two end regions. Furthermore, a slot or long hole, comprising an insertion opening, a retaining opening and a displacement region located between the insertion opening and the retaining opening, is arranged in the first end region of the closing plate. The displacement region narrows from the insertion opening in the direction of the retaining opening and forms a narrowed neck location. The chain pin has at one end a pin head with a pin neck and at the other end has a pin foot. A diameter of the insertion opening is larger than a diameter of the pin head 41. A diameter of the retaining opening is smaller than the diameter of the pin head and larger than, or at least equal to, a diameter of the pin neck. The narrowed neck location is dimensioned to be smaller than the diameter of the pin neck. A securing or clamping region is arranged between the narrowed neck location and the retaining opening of the slot and is dimensioned to be smaller than the diameter of the pin neck.

This has the effect of the pin, when it has negotiated the narrowed location in the displacement region of the slot, being retained with clamping action in the retaining opening by the clamping region. The clamping region constitutes a further detachment-prevention mechanism. In the prior art, the retaining opening, up to the narrowed location, described a circle arc with a diameter which was dimensioned to be somewhat larger than the pin-neck diameter. The clamping region according to an embodiment, then, is arranged between the circle arc of the retaining opening and the narrowed location and allows play-free clamping of the pin against the periphery of the retaining opening and/or the periphery of the depression. The pin is clamped in the radial direction, that is to say in a direction transverse to the longitudinal axis of the pin B. The clamping region is arranged in the lower half of the displacement region.

In particular, the closing plate is of asymmetrical design along its longitudinal axis V and the connecting region of the closing plate has a concave peripheral region and a non-concave peripheral region. The non-concave peripheral region is designed in the form of a straight or rectilinear peripheral region.

A positive effect of this asymmetrical design is that the cross-sectional surface area of the closing plate increases. The cross-sectional surface area here corresponds to the surface area which is visible if the closing plate is cut centrally along its transverse axis (in a direction perpendicular to its longitudinal axis V). Conventional closing plates of chain-closing links, like the rest of the outer link plates and inner link plates, usually have a connecting region which is symmetrical, and therefore concave on either side (cf. figure from the prior art). The cross section of a closing plate which is of concave design on either side therefore has a smaller surface area than a closing plate with a less concave or non-concave peripheral region. The less concave the peripheral region, the larger the cross-sectional surface area. A straight or rectilinear peripheral region has a cross section which is larger than a concave peripheral region, but less than a convex peripheral region.

It is precisely in the case of narrow chains with thin closing plates, as are needed for a large number of gears, that it is necessary to provide a sufficiently large cross-sectional surface area with enough material to ensure sufficient stability of the closing plates.

The rectilinear peripheral region is a good compromise between stability and rolling behavior of the closing link. Firstly, the stability and the fracture resistance of the closing plate increase because the cross-sectional surface area of the closing plate is increased in comparison to a concave peripheral region. Secondly, the rolling behavior of the closing link on the upper chain roller is improved in relation to the embodiment with a convex peripheral region.

In one exemplary embodiment, the clamping region is formed by two clamping slopes which are located opposite one another. The two clamping slopes run in a non-parallel state in relation to one another. Rather, the two clamping slopes run away from one another in the direction of the retaining opening (that is to say in the assembly direction) and therefore their distance apart from one another increases. This has the effect of the pin being pushed in the direction of the retaining opening. The distance between the two clamping slopes here is dimensioned such that, even at the widest location A2, the distance is still smaller than the diameter D42 of the pin neck. The clamping region is, or the clamping slopes are, arranged in the lower half of the displacement region. The clamping region interacts, or the clamping slopes interact, with the pin neck.

It would likewise be conceivable to arrange the clamping region, or the clamping slopes located opposite one another, in the upper half of the displacement region. The clamping region would then interact with the pin head. The distance between the clamping slopes would then be dimensioned such that, even at the widest location, it would still be smaller than the diameter of the pin head. In its end position, the pin head would butt against the two clamping slopes and against the periphery of the depression. It would therefore likewise be the case that, in its end position, the pin would be retained or clamped in a play-free manner in the closing plate.

A combination of clamping regions level with the pin neck and level with the pin head would likewise be conceivable.

In one exemplary embodiment, the slot has a ramp in its displacement region. The pin head slides along the ramp by way of its underside when the chain-closing link is being assembled. The ramp slopes up in the direction of the retaining opening along the displacement region. The ramp constitutes an additional detachment-prevention mechanism. The pin head has to negotiate the upward slope of the ramp, and therefore the clamping action of the latter in the axial direction of the pin, before it reaches its end position.

In one exemplary embodiment, the displacement region of the slot narrows from the insertion opening in the direction of the retaining opening at a further location, and therefore, in addition to the narrowed neck location, a narrowed head location also forms. The narrowed head location here is dimensioned to be smaller than the diameter of the pin head. The additional narrowed head location constitutes a further detachment-prevention mechanism for the closing link.

In one exemplary embodiment, a longitudinal axis L of the slot runs obliquely in relation to the longitudinal axis V of the closing plate.

In particular, the longitudinal axis L of the slot runs at an angle of 5 degrees to 25 degrees, preferably 15 degrees, in relation to the longitudinal axis V of the closing plate.

This oblique positioning of the slot in relation to the longitudinal axis V of the closing plate ensures that there is enough material around the slot, that is to say a sufficient distance from the peripheries of the closing plate. The stability of the closing plate is thus maintained.

In one exemplary embodiment, the connecting region of the closing plate has a recess. The recess allows a particularly narrow chain construction, because the closing plates can be fitted very closely together and there is therefore enough space remaining for engagement of the teeth.

The recess can be produced by stamping or milling. The outer side of the closing plate here preferably remains flat. This prevents the situation where the outer side of the closing plate collides in an undesired manner with teeth or other components during changeover from one gearwheel to the next.

This is a thin embodiment of the closing plate, which may involve an enlarged cross-sectional surface area and therefore a non-concave peripheral region. It is also conceivable, however, for the stamping to push material on the outer side, which results in a non-flat outer side.

In one embodiment, the recess is dimensioned to be smaller, as seen in the direction of the longitudinal axis of the closing plate, in the region of the rectilinear peripheral region than in the region of the concave peripheral region. This has the effect that the cross-sectional surface area of the closing plate is further increased because of the smaller recess, which in turn increases the stability of the closing plate.

In particular, those contours of the recess which run symmetrically relative to the transverse axis of the closing plate have a curved, tapering profile from the concave peripheral region towards the centrally located closing-plate longitudinal axis. From the closing-plate longitudinal axis towards the rectilinear peripheral region, the contours run substantially rectilinearly, i.e. parallel to the transverse axis of the closing plate. The recess, as seen in the direction of the closing-plate longitudinal axis, is therefore dimensioned to be smaller in the region of the rectilinear peripheral region and in the region in the vicinity of the closing-plate longitudinal axis than in the region of the concave peripheral region.

In the further development of derailleur gear systems for bicycles, the number of sprockets on the multiple sprocket has increased more and more in a stepwise manner. This has gone hand in hand with changes in the dimensions of sprockets, link plates, chain pins and chain rollers, in particular in the dimensions in the direction parallel to the longitudinal axis of the chain pins/in the axial direction. This mechanism that the chain is adapted to the rear sprockets, which are being placed at smaller and smaller axial distances from one another on the rear-wheel hub. It is clear here that those constituent parts of the chain which project in the axial direction beyond the outer side of the chain are also obstructive, because they can come into contact, in an undesired and problematic way, with constituent parts of the adjacent sprocket. A reduction in the dimensions of the constituent parts of the chain also requires the closing link to be adapted to a particularly narrow chain.

Another object of the invention is therefore to provide a closing link which allows both a narrow construction, with only a small distance between the closing plates, and reliable engagement of the teeth between the closing plates and also provides sufficient stability and detachment prevention.

The prior art already discloses curved or banana-shaped closing links, for example in U.S. Pat. Nos. 7,712,298 and 7,914,410. One disadvantage of these curved closing links, however, is that they do not allow a narrow construction. A disadvantage with the known closing links from the prior art is that there is insufficient detachment prevention in the case of pronounced loading. The two documents merely disclose a detachment-prevention mechanism in the form of a narrowed location which is formed by two protrusions in the displacement region of the slot and interacts with the pin neck. During assembly, the pin neck snap-fits behind said protrusion.

The presented embodiments achieve this object by way of a chain-closing link comprising two closing parts each with a closing plate and a chain pin connected in a rotationally fixed manner to the closing plate. The closing plate has a first end region, a second end region and a connecting region between the two end regions. The connecting region of the closing plate has a concave peripheral region and a non-concave peripheral region. Furthermore, a slot, comprising an insertion opening, a retaining opening and a displacement region located between the insertion opening and the retaining opening, is arranged in the first end region of the closing plate. The displacement region narrows from the insertion opening in the direction of the retaining opening and forms a narrowed head location and/or a narrowed neck location. The chain pin has at one end, a pin head with a pin neck and at the other end a pin foot. A diameter of the insertion opening is larger than a diameter of the pin head, and a diameter of the retaining opening is smaller than the diameter of the pin head and larger than a diameter of the pin neck. The narrowed head location is dimensioned to be smaller than the diameter of the pin head and/or the narrowed neck location is dimensioned to be smaller than the diameter of the pin neck. The connecting region of the closing plate has a recess and the non-concave peripheral region is in particular designed in the form of a rectilinear peripheral region.

The recess in the connecting region gives rise to a depression in relation to the first and second end regions of the closing plate. It is therefore the case, even with a narrow chain construction, that the depression creates enough space in order to allow the teeth of the chain rings or sprockets to engage. This is necessary particularly in the case of drives with just one chain ring and an increased number of approximately 12 sprockets. In particular, such drives often have thick and thin teeth alternating on the front chain wheel and/or the rear sprockets. In this case, the recess creates enough space in order for it also to be possible for a thick tooth of this kind to engage in the interspace of the closing link.

The rectilinear peripheral region is a good compromise between stability and rolling behavior of the closing link. Firstly, the stability and the fracture resistance of the closing plate increase because the cross-sectional surface area of the closing plate is increased in comparison to a concave peripheral region. Secondly, the rolling behavior of the closing link on the upper chain roller is improved in relation to the embodiment with a convex peripheral region.

In one embodiment, the recess is dimensioned to be smaller, as seen in the direction of the longitudinal axis of the closing plate, in the region of the rectilinear peripheral region than in the region of the concave peripheral region. This has the effect that the cross-sectional surface area of the closing plate is further increased because of the smaller recess, which in turn increases the stability of the closing plate.

In particular, those contours of the recess which run symmetrically relative to the transverse axis of the closing plate have a curved, tapering profile from the concave peripheral region towards the centrally located closing-plate longitudinal axis. From the closing-plate longitudinal axis towards the rectilinear peripheral region, the contours run substantially rectilinearly, i.e. parallel to the transverse axis of the closing plate. The recess, as seen in the direction of the closing-plate longitudinal axis, is therefore dimensioned to be smaller in the region of the rectilinear peripheral region and in the region in the vicinity of the closing-plate longitudinal axis than in the region of the concave peripheral region.

At the same time, the detachment-prevention mechanism in the form of a narrowed head location and/or narrowed neck location affords enhanced detachment prevention.

In one embodiment, a securing region is arranged between the narrowed head location and the retaining opening of the slot and is dimensioned to be smaller than the diameter of the pin head. As an alternative, or in addition, to the securing region, a further securing region is arranged between the narrowed neck location and the retaining opening of the slot and is dimensioned to be smaller than the diameter of the pin neck.

The securing region constitutes a detachment-prevention mechanism. In addition, it has the effect of the pin, when it has negotiated the narrowed location in the displacement region of the slot, being retained with clamping action, and in a play-free manner, in the retaining opening by the securing region. The securing region can be arranged here level with the pin neck (in the lower half of the displacement region) and/or with the pin head (in the upper half of the displacement region).

The terms "upward(s)" and "downward(s)" refer, inter alia, to the direction of the longitudinal axis B of the pin, wherein the pin head 41 is arranged further upwards than the pin neck 42, and the pin foot 43 is arranged further downwards than the pin neck 42. The terms "inner" and "outer" refer to the sides of the closing plates. The inner surfaces of the closing plates are directed towards one another in the assembled state of the closing link. The outer surfaces of the closing plates are directed away from one another in the assembled state of the closing link. The terms are used equally in conjunction with the pins and the closing plates.

To give a better understanding of the invention, the first figure in FIG. 1 shows part of a bicycle chain 1 which is known from the prior art and has a conventional closing link 5. The chain 1 comprises alternating pairs of outer link plates 2 and inner link plates 3. The pairs of link plates are connected in an articulated manner by chain rivets 4. Each chain rivet 4 is assigned a chain roller 6.

FIGS. 1a to 4d illustrate the steps for assembling the chain-closing link 5. For assembly purposes, the two closing parts of the closing link first of all are oriented in relation to one another, and are then introduced one inside the other and displaced in relation to one another. The displacement movement takes place both in the direction of the longitudinal axis of the closing plates V and of the slot L and in the direction of the longitudinal axis B of the pin. Finally, the closing parts latch in, and fix, in their end position.

Figure 1B:
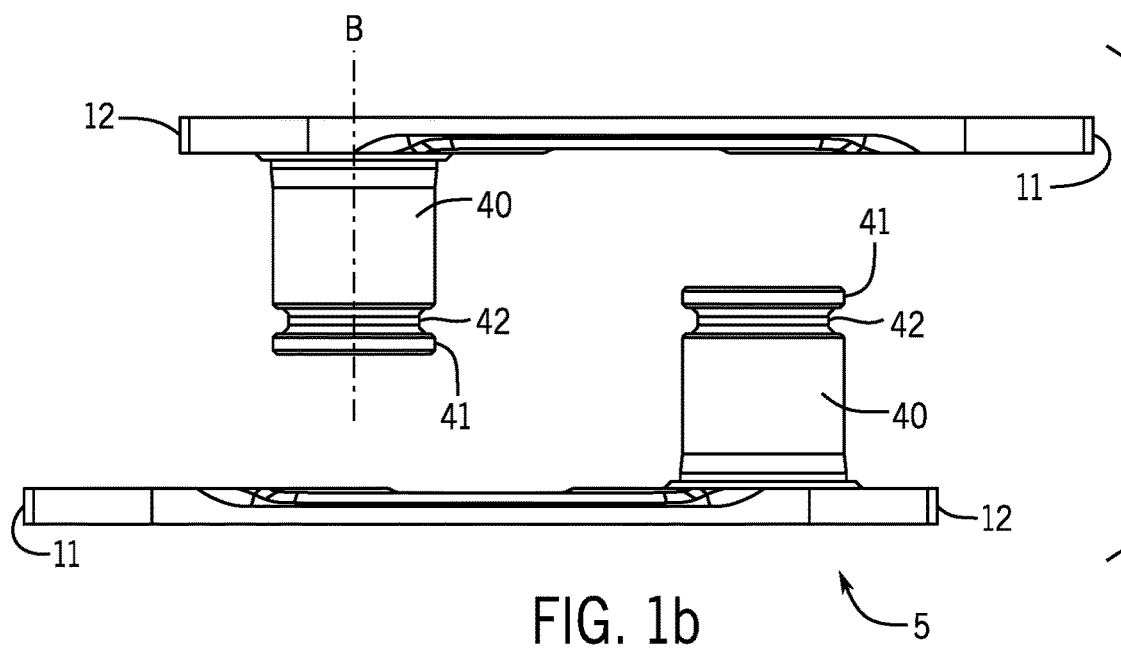
FIG. 1b shows a side view of the chain-closing link from FIG. 1a FIG. 2 shows the first assembly step.

FIG. 1a and FIG. 1b show the chain-closing link 5 in the non-assembled state. The two identical closing parts, each comprising a closing plate 10 and a chain pin 40, have been rotated through 180 degrees in relation to one another and oriented for assembly purposes. FIG. 1a shows a perspective view of the chain-closing link 5. The inner sides of the two closing plates 10 are directed towards one another. The closing plates 10 each have a first end region 11, with a slot 20, and a second end region 12, with a pin bore 16. The arrow which has been introduced in the connecting region 15 located between the two end regions 11, 12 of the closing plate 10 indicates the running direction of the chain and therefore the orientation of the closing link 5 for assembly purposes. With their one end, the pin foot 43, the pins 40 are pre-assembled, in particular riveted, in a rotationally fixed manner in each case in the pin bore 16. The pin head 41 is located at the other end of the pin 40. FIG. 1b shows a side view of the chain-closing link 5 from FIG. 1a. The pin 40 extends along its longitudinal axis B. The pin 40 tapers at the pin neck 42 in relation to the pin body and pin head 41. The pin head 41 has a diameter, which is dimensioned to be smaller than the diameter of the insertion opening 21 of the slot 20. It is therefore possible in each case for the pin head 41 of the one closing part to be introduced into the insertion opening 21 of the slot 20 of the respectively other closing part.

Figure 2:
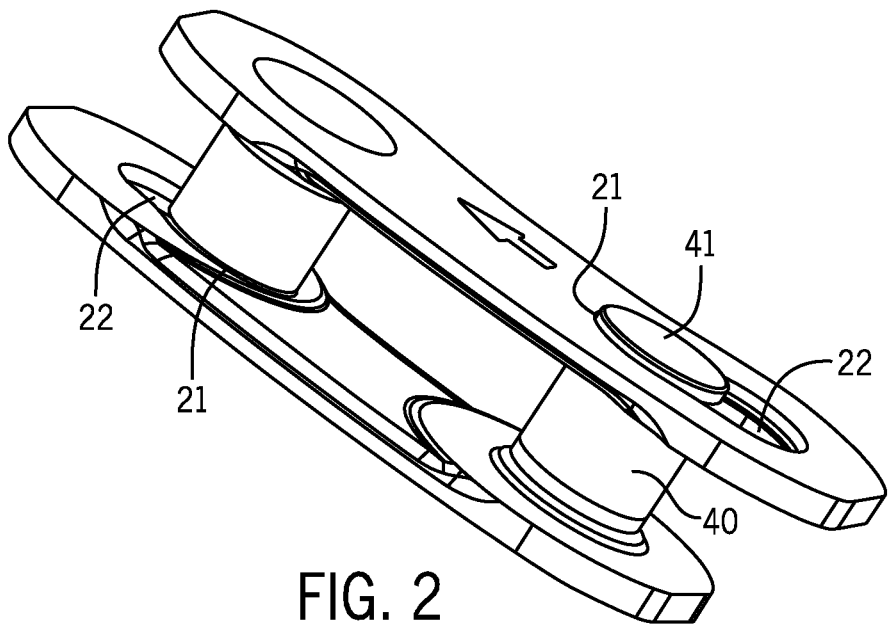

FIG. 2 shows the first step for assembling the closing link. For this purpose, in each case the smaller-diameter pin 40 of the one closing part is introduced into the larger-diameter insertion opening 21 of the respectively other closing part. The pin 40 is thus positioned in the direction of the longitudinal axis B such that the pin head 41 projects slightly beyond the outer surface of the closing plate 10. The two closing parts are guided one inside the other without any force being applied.

Figure 3:
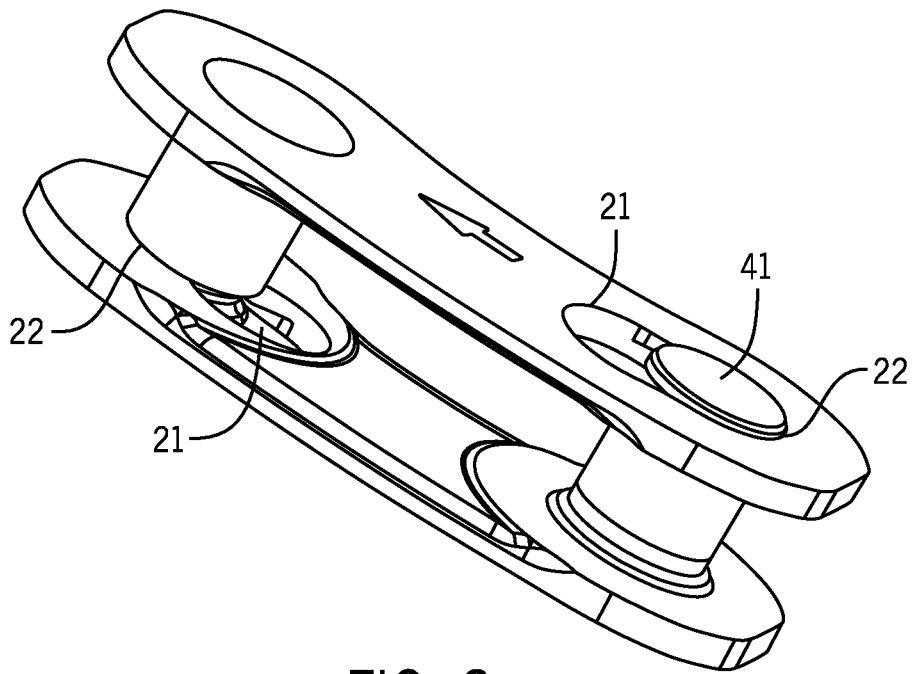
FIG. 3 shows the second assembly step.

FIG. 3 shows the following, second assembly step, in which the two closing parts are displaced in relation to one another. The pins 40 here move in each case along the slot 20 from the insertion opening 21 to the retaining opening 22. The displacement movement takes place predominantly in the direction of the longitudinal axis of the closing plates V; the pin 40 here moves only to a slight extent in the direction of its longitudinal axis B. On its way from the larger-diameter insertion opening 21 to the smaller-diameter retaining opening 22, the pin 40 passes a displacement region of the slot 20. A plurality of narrowed locations, which the pin 40 has to negotiate, are arranged in the displacement region of the slot 20. The pin 40 can be displaced only under the action of force. The pin 40 snap-fits or latches, as it were, in the retaining opening 22.

Figure 4A:
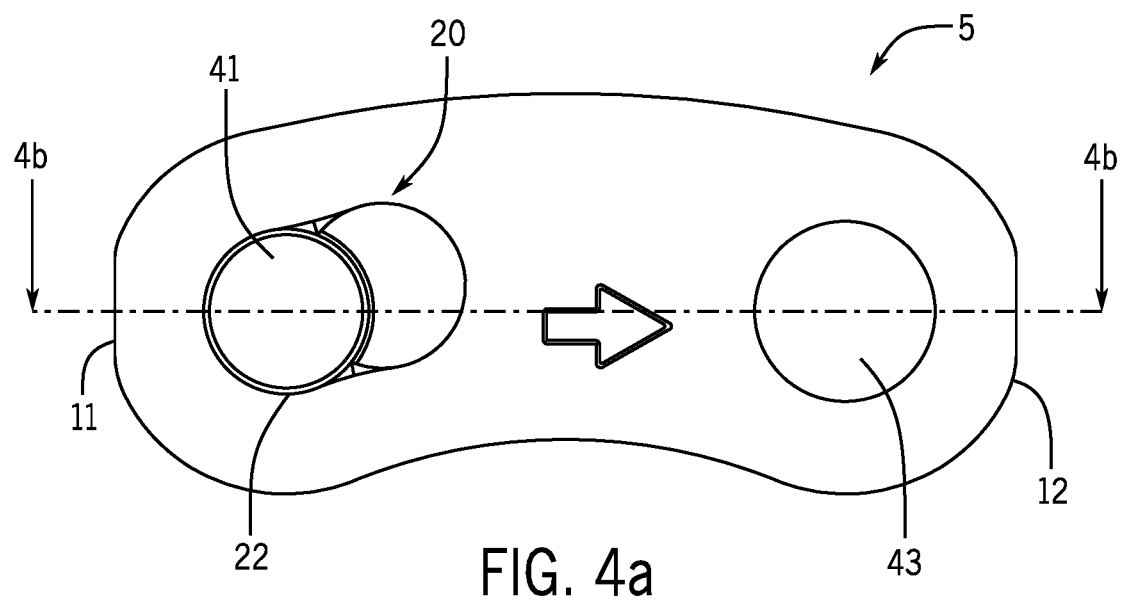
FIG. 4a shows the third assembly step-end position in a plan view.
Figure 4B:
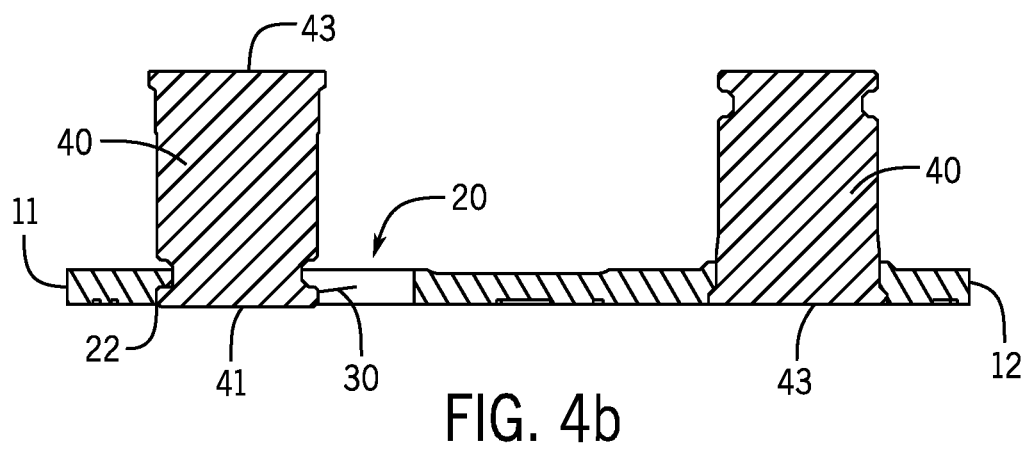
FIG. 4b shows a sectional view of FIG. 4a taken along section line 4b-4b.
Figure 4C:
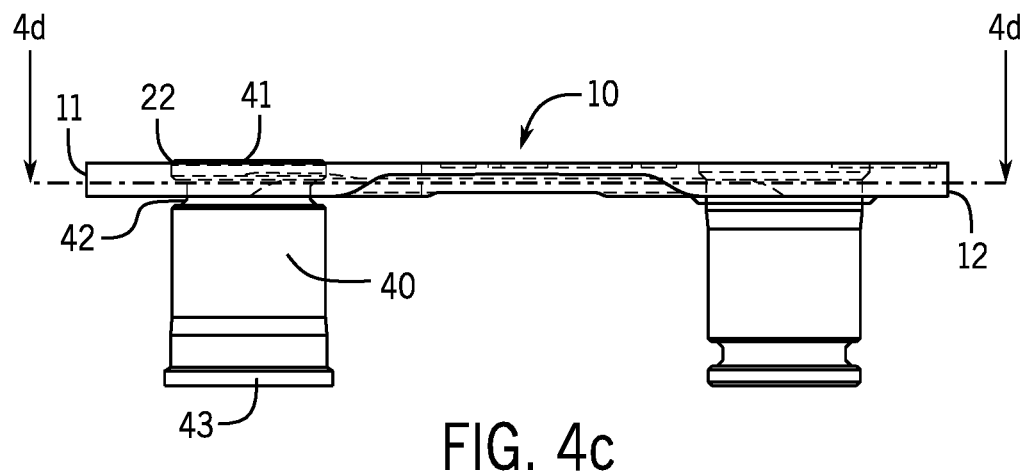
FIG. 4c shows a side view of FIG. 4a, FIG. 4d shows a sectional view of FIG. 4c taken along section line 4d-4d, FIGS. 5a and b show a detail-form view of the slot in plan view.
Figure 4D:
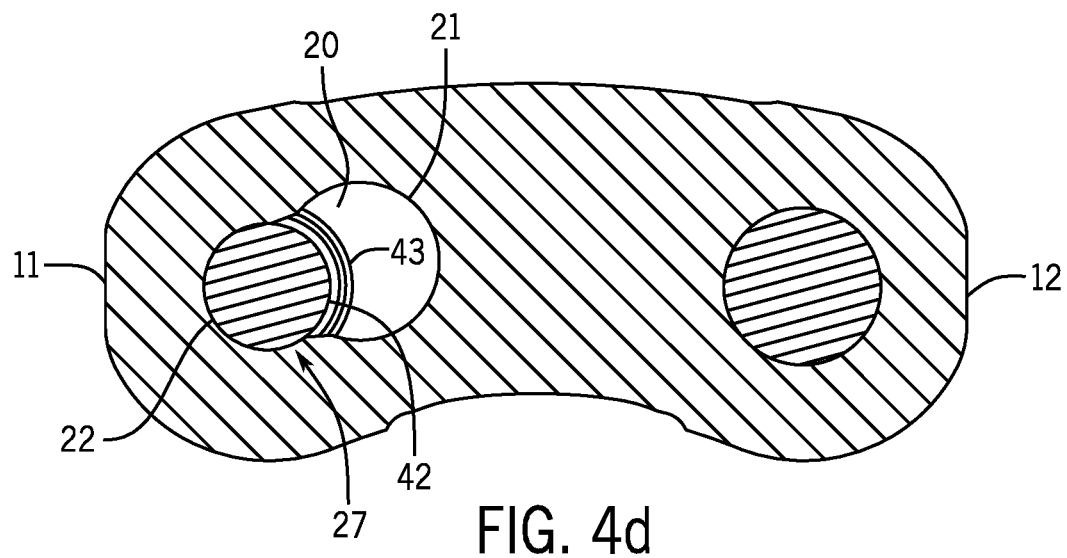

FIGS. 4*a* to 4*d* show the third assembly step and thus also the end position of the two closing parts. In order to simplify matters, although two pins 40 have been illustrated, just one closing plate 10 of the closing link 5 is illustrated. FIG. 4*a* illustrates a plan view of the definitively assembled closing link 5. The pin head 41 is located in its end position in the retaining opening 22 of the slot 20. FIG. 4*b* is the sectional view of FIG. 4*a* taken along section line 4*b*-4*b*. It is clearly evident here that, once it has negotiated the ramp 30, the pin head 41 is arranged in the slot 20 at such a low level that it barely projects, if it does so at all, beyond the outer side of the closing plate in the axial direction B. This has the advantage that the closing link is very narrow in the axial direction B and does not collide with other components, in particular the sprockets. FIG. 4*c* shows a side view of FIG. 4*a* with the two bolts 40 and a closing plate 10. The one pin head 40, in this case the one on the left of the figure, is located in its end position in the retaining opening 22 of the slot 20. FIG. 4*d* is a sectional view of FIG. 4*c* taken along section line 4*d*-4*d*, which runs through the pin neck 42 just beneath the pin head 41. This figure indicates the securing or clamping region 27, which retains the pin 40 in a play-free manner in the retaining opening 22. The diameter D42 of the pin neck 42 is somewhat larger than the distance between the mutually opposite slopes of the clamping region 27. The clamping slopes act on the pin neck 42 and press the pin 40 against the periphery of the retaining opening 22 in the direction of the first end region 11. In the end position, the pin 40 butts both against the periphery of the retaining opening 22 and against the two clamping slopes of the clamping region 27. The at least three contact points ensure play-free clamping of the pin 40 in its end position.

Figure 5A:
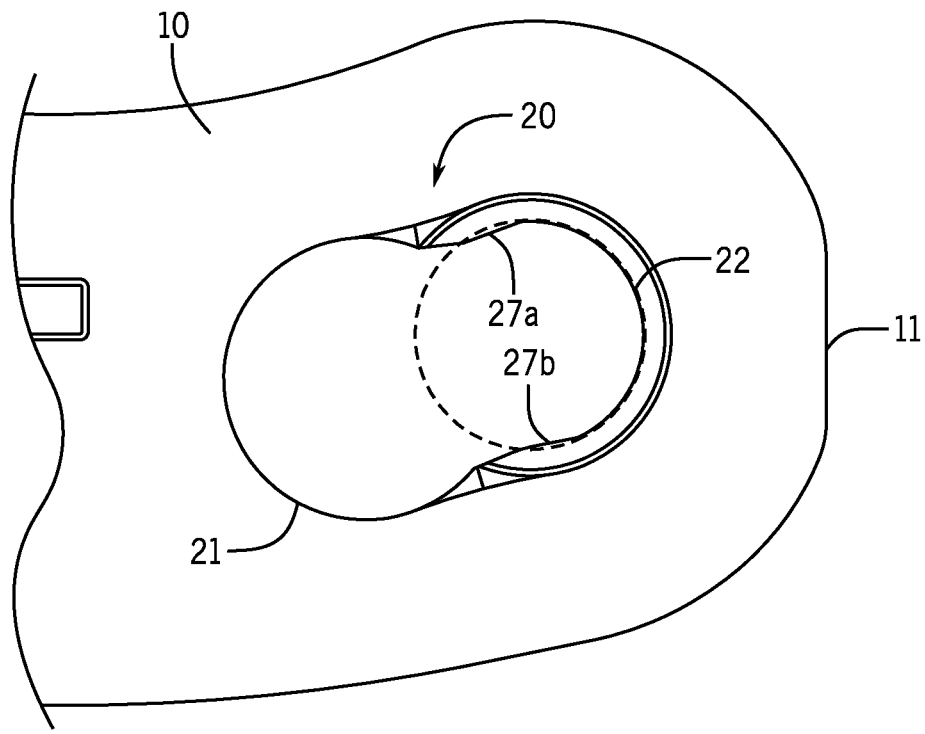
Figure 5B:
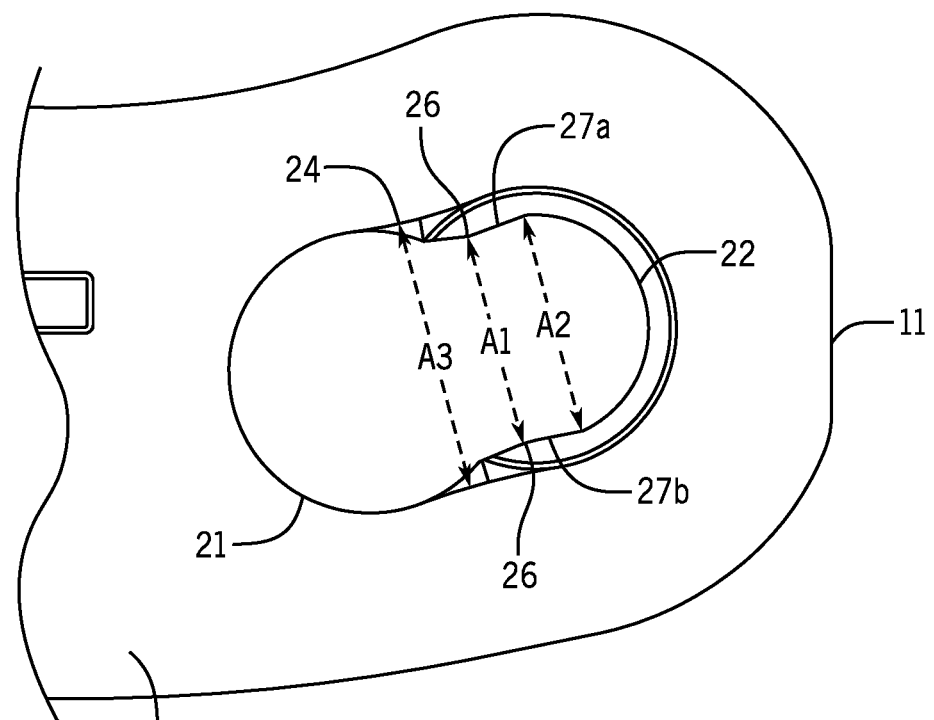
Figure 6:
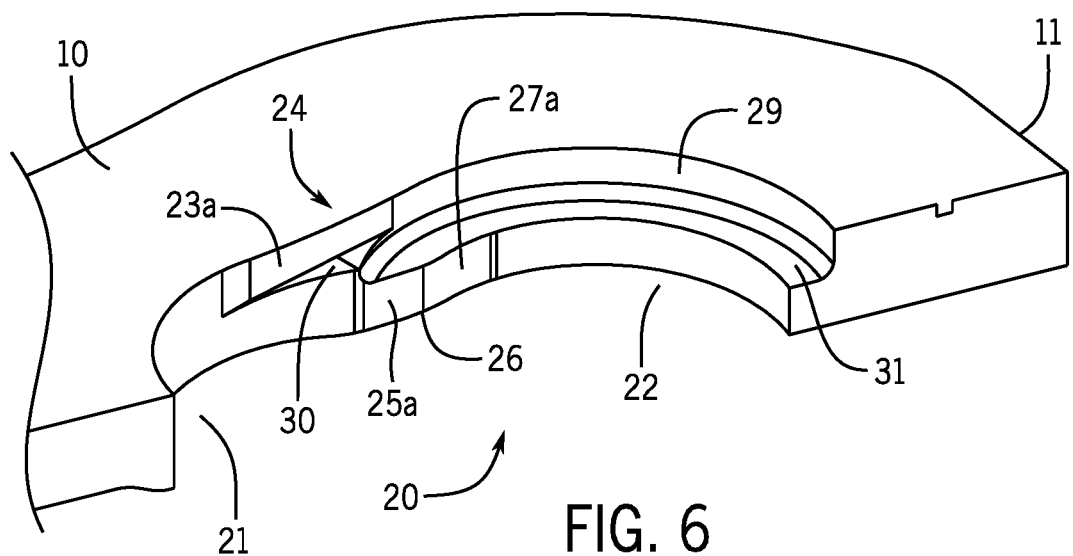
FIG. 6 shows a detail-form perspective view of the slot in section.

To give a better understanding, FIGS. 5*a*, 5*b* and 6 show detail-form views of the slot 20 without the pin 40. FIG. 5*a* is a detail-form view of the slot 20 in plan view that is to say showing the outer side of the closing plate 10. The slot 20, in simple terms, comprises a larger-diameter insertion opening 21, a displacement region and a smaller-diameter retaining opening 22. The displacement region, which is located between the two openings 21, 22, narrows in the direction of the retaining opening 22. The insertion opening 21 describes a portion of a circle with a diameter, which is dimensioned to be somewhat larger than the pin head 41. The retaining opening 22 also describes a portion of a circle, this time of the diameter, which corresponds to, or is slightly larger than, the diameter of the pin neck 41. The retaining opening 22 is adjoined by the clamping region 27. The clamping region 27 is formed by two clamping slopes 27*a*, 27*b*, which are located opposite one another and run in a non-parallel state in relation to one another. To make things clear, a dashed-line circle is indicated with a diameter which corresponds approximately to the retaining opening 22 and/or the pin neck. It can be seen that the clamping slopes 27*a*, 27*b* are located to a marked extent within the circle indicated, and the pin will therefore not have enough space in its end position. The lack of space results, during assembly, in slight deformation of the pin and of the closing plate. This elastic deformation causes the pin to be clamped along the pin neck in the slot 20. As depicted in FIG. 5*b*, the distance between the mutually opposite clamping slopes 27*a*, 27*b* increases in the direction of the retaining opening 22 from an extent A1 to an extent A2. As a result, the pin is pushed in the direction of the retaining opening 22. The distance A1 between the two clamping slopes 27*a*, 27*b* corresponds, at the same time, to the narrowed neck location 26 in the displacement region of the slot 20. The pin neck has to overcome said narrowed neck location 26, under the action of force, before it is then pushed along the clamping slopes 27*a*, 27*b*, in the assembly direction, into the end position. The distance A1 here is dimensioned to be somewhat smaller than the diameter of the pin neck. The distance A2 corresponds approximately to the diameter of the pin neck. The distance A3 corresponds to the narrowed head location 24 and is dimensioned to be smaller than the diameter of the pin head. It is therefore likewise the case that the pin head has to negotiate said narrowed head location under the action of force. Both the narrowed location which has to be negotiated level with the pin neck and the narrowed location level with the pin head cause the pin to be clamped radially along the neck and the head, respectively. The two narrowed locations are arranged one behind the other in the assembly direction and each constitute a detachment-prevention mechanism.

In a particularly preferred embodiment, the insertion opening has a diameter of 3.75 mm and the retaining opening has a diameter of 3 mm. The displacement region thus tapers by 0.75 mm in the assembly direction. The pin head has a diameter of 3.64 mm and can thus be guided easily into the insertion opening. The pin neck has a diameter of 2.93 mm and has sufficient space in the retaining opening. The starting distance A1 between the clamping slopes is 2.82 mm and the end distance A2 is 2.93 mm, and therefore the pin neck is retained reliably in its end position.

FIG. 6 shows a perspective view, in section, of the closing plate 10, and of the vastly enlarged slot 20, with reference to which the displacement of the bolt in the assembly direction can best be described. In order to render the contour of the slot 20, and in particular the displacement region, more clearly evident, FIG. 6 shows just one side of the slot 20, and the course taken by the pin along said illustrated side of the slot 20. Of course, the pin moves equally along the other side of the slot (not visible here). It is naturally the case that the effect of the clamping slopes and narrowed locations can occur only when that side of the slot which is not illustrated here has been put in place.

In the first assembly step, first of all the pin head is fitted into the insertion opening 21 of the slot 20. The pin head, then, is located in the upper half of the insertion opening 21 of the slot 20 or some way above this (cf. also FIG. 2).

The "upper half" of the slot is that region of the slot which is closer to the outer side of the closing plate 10. In FIG. 6, the outer side of the closing plate 10 is oriented upwards. Correspondingly, the "lower half" of the slot is closer to the inner side of the closing plate. The pin head moves in the assembly direction, on account of the dimensions of the pin and slot, merely in the upper half of the slot. Correspondingly, the pin neck moves in the lower half of the slot. The lower half of the slot provides enough space for the pin head only in the region of the insertion opening 21, but not in the displacement region or in the region of the retaining opening 22.

In the second assembly step, the pin is displaced in the assembly direction (along the longitudinal axis L of the slot) towards the retaining opening 22 and in the process passes, in a number of steps, the displacement region between the insertion opening 21 and the retaining opening 22 (cf. also FIG. 3).

The lateral periphery of the pin head slides first of all, under the action of increasing force, along the upwardly sloping head-clamping slope 23*a*, before reaching the narrowed head location 24. The corresponding second head-clamping slope (23*b*) is located on the opposite side of the slot (said opposite side not being illustrated). Once the pin head has negotiated the narrowed head location 24, it butts, in its end position, against the periphery 29 of the depression. The narrowed head location 24 is formed by two mutually opposite surfaces or edges in the upper half of the slot 20. The distance A3 at the narrowed head location 24 is dimensioned to be smaller than the diameter of the pin head (cf. FIG. 5*b*). The pin head can negotiate the narrowed head location 24 only under the action of force.

At the same time as the above described assembly movement of the lateral pin-head periphery along the sides of the slot, the underside of the pin head slides over the ramp 30, before butting, in its end position, against the base 31 of the depression. Once it has negotiated the ramp 30, the pin head snap-fits downwards, in the direction of the longitudinal axis B of the pin, in the base 31 of the depression. The ramp 30 here in the first instance slopes up, then reaches a highest point and, thereafter, slopes down again. The edge of the highest point of the ramp 30 is clearly evident in FIG. 6. The level of the ramp 30 here is located above the base 31 of the depression to such an extent that this difference can be negotiated, and the closing parts released from one another, only under the action of increased force. In its end position, the pin head butts both against the periphery 29 and against the base 31 of the depression. At the same time, the periphery of the retaining opening 22 engages in the encircling pin groove or the pin neck and the rest of the pin body extends beneath the closing plate 10 (cf. FIG. 4). The pin is therefore secured in the axial direction B. The ramp 30 is a detachment-prevention mechanism.

At the same time as the above described assembly movement of the pin head, the pin neck moves along the lower half of the slot 20. The pin neck first of all slides along the upwardly sloping neck-clamping slope 25*a* under the action of increasing force, before reaching the narrowed neck location 26. The corresponding second neck-clamping slope (25*b*) is located on the opposite side of the slot 20 (said opposite side not being illustrated here). The narrowed neck location 26 is formed by two mutually opposite edges in the lower half of the slot 20. The distance A1 at the narrowed neck location 26 is dimensioned to be smaller than the diameter D42 of the pin neck (cf. FIG. 5*b*). The pin neck can negotiate the narrowed neck location 26 only under the action of force. Once the pin neck has negotiated the narrowed neck location 26, it is retained in its end position by the clamping slopes 27*a*, 27*b*. The clamping region 27 is formed by two mutually opposite clamping slopes 27*a*, 27*b*. The two clamping slopes 27*a*, *b* run in a non-parallel state in relation to one another, but run away from one another in the direction of the retaining opening (that is to say in the assembly direction), and therefore their distance apart from one another increases. This has the effect of the pin being pushed in the direction of the retaining opening 22. In its end position, the pin neck butts against the two clamping slopes 27*a*, 27*b* and against the periphery of the retaining opening 22. This means that the pin, in its end position, is retained, or clamped, in a play-free manner in the closing plate 10. Clamping takes place in the radial direction of the pin and constitutes a detachment-prevention mechanism.

The two narrowed locations described above are located at different levels. In addition, the narrowed locations are arranged one after the other in the assembly direction (as seen from the insertion opening 21 in the direction of the retaining opening 22). In the exemplary embodiment shown, the narrowed head location 24 is located in front of the narrowed neck location 26, as seen in the assembly direction. This means that it is first of all necessary for the pin head to pass the narrowed head location 24 before the pin neck can pass the narrowed neck location 26. It would also be possible for the narrowed locations to be arranged one above the other, however, in which case they would have to be negotiated at the same time.

Once the pin has negotiated the two radial narrowed locations in the region of the pin head and pin neck, and has also negotiated the axial clamping action of the ramp, it snap-fits in its end positon and, on account of the clamping region 27, butts in a play-free manner against the closing plate 10.

During assembly, the two pins of the two closing parts negotiate the respective detachment-prevention mechanism at the same time, and therefore the closing parts, in their end positon, are secured in a play-free and reliable manner. Accordingly, assembly has to take place under the action of a relatively large amount of force, which can be exerted in a defined and controlled manner ideally by an assembly tool.

It is likewise necessary for all the detachment-prevention mechanisms described above to be negotiated in the detachment direction (as seen from the retaining opening 22 in the direction of the insertion opening 21), which requires the action of at least as much force as the assembly. An appropriate tool is also necessary for detachment purposes. During travel, even in the case of extremely high loading, such high forces are achieved extremely infrequently, and therefore stable closure of the chain is ensured.

The various detachment-prevention mechanisms in the form of the narrowed location level with the pin neck and/or of the narrowed location level with the pin head, of the clamping surfaces level with the pin neck and/or of the clamping surfaces level with the pin head (radial pin clamping) and the ramp (axial pin clamping) can be used separately from one another or in combination with one another.

Figure 7A:
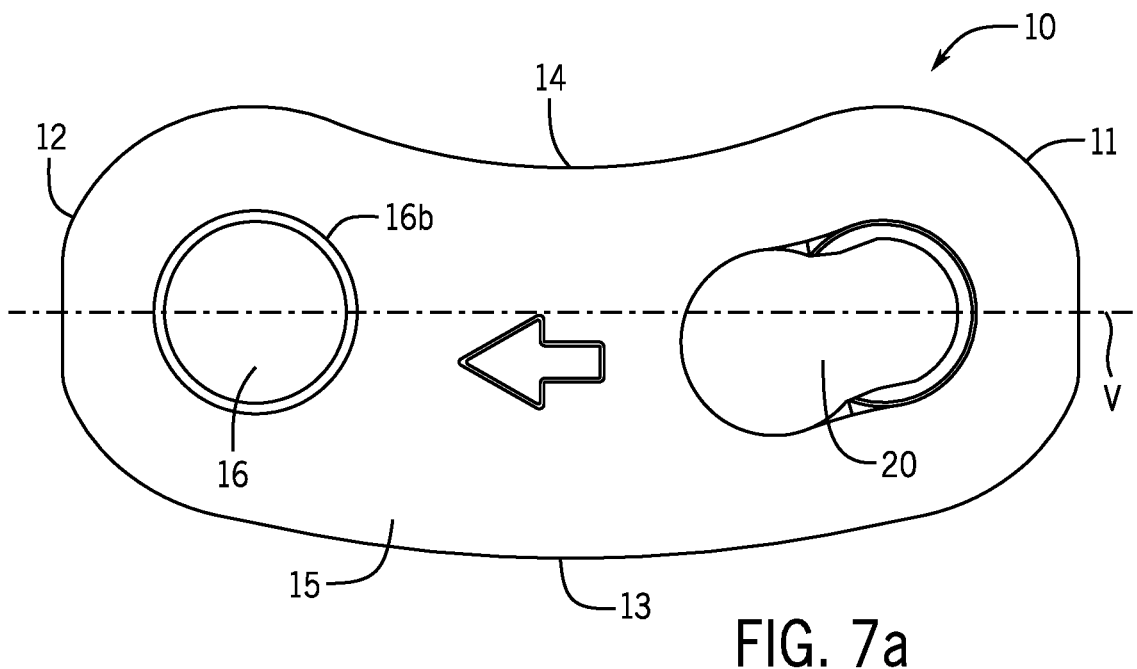
FIG. 7a shows a first embodiment of the closing plate in plan view.
Figure 7B:
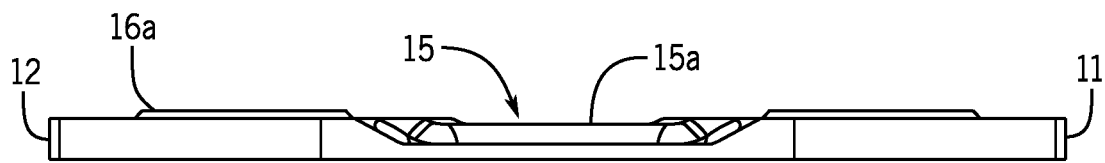
FIG. 7b shows FIG. 7a in a side view.
Figure 7C:
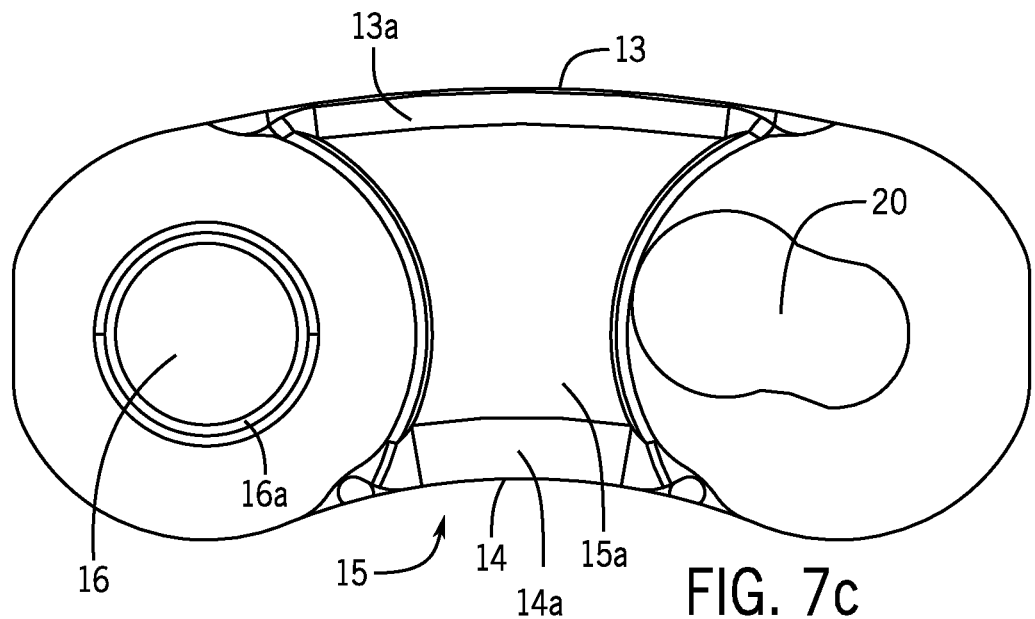
FIG. 7c shows a bottom view of FIG. 7a, FIG. 8a shows a second embodiment of the closing plate in plan view.
Figure 8A:
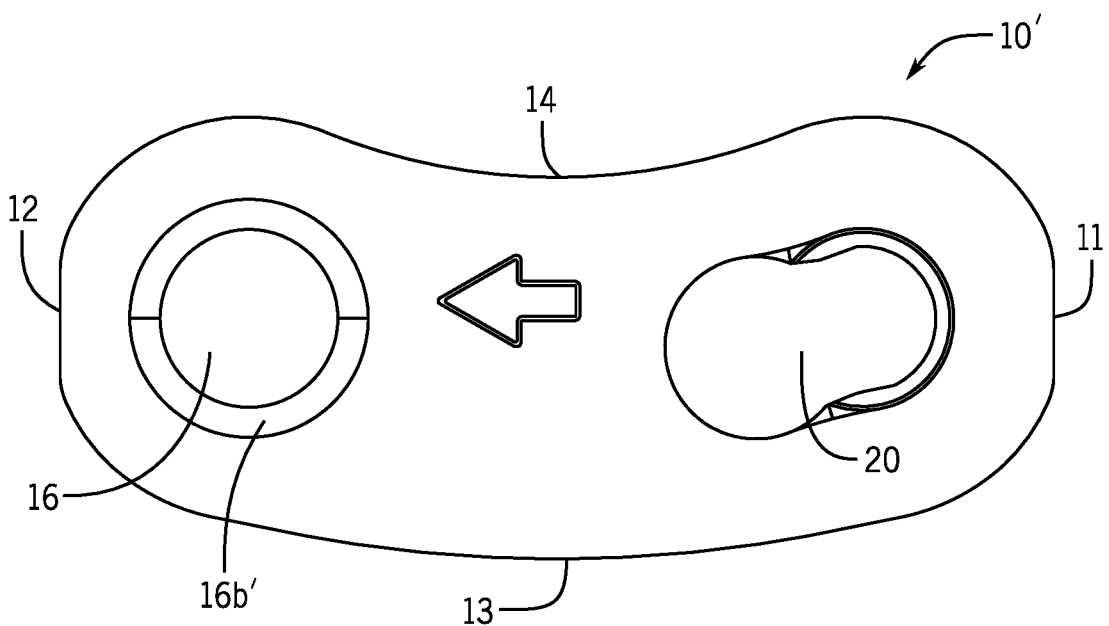
FIG. 8b shows FIG. 8a in a side view.
FIG. 8c shows a bottom view of FIG. 8a, FIG. 8d shows a perspective view of FIG. 8a, FIG. 9a shows a third embodiment of the closing plate in plan view.
Figure 8B:
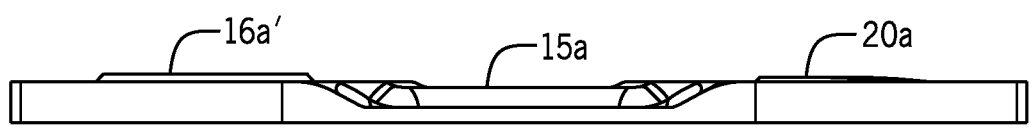
Figure 8C:
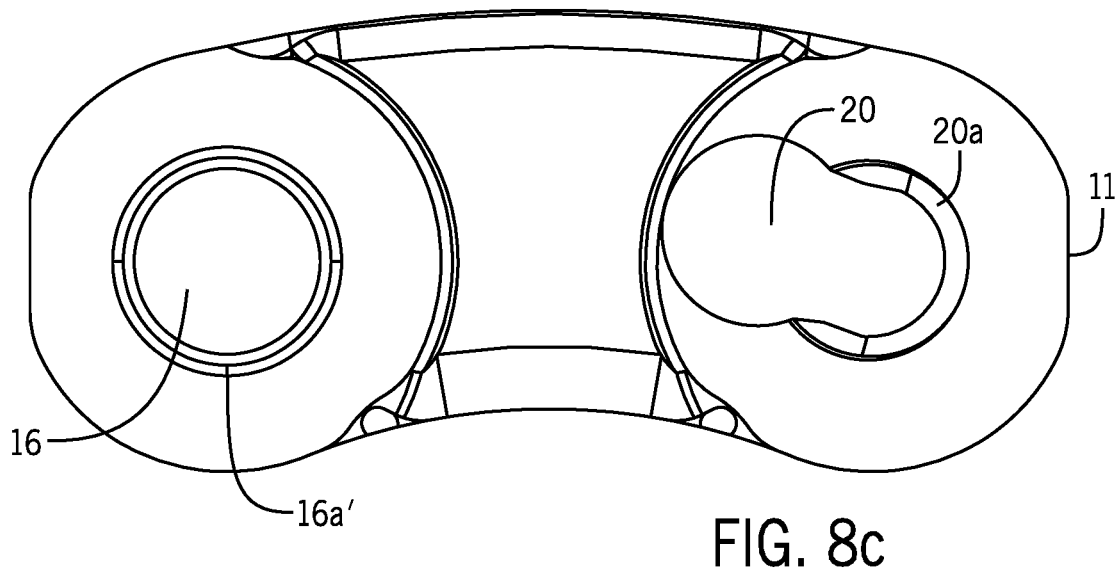
Figure 8D:
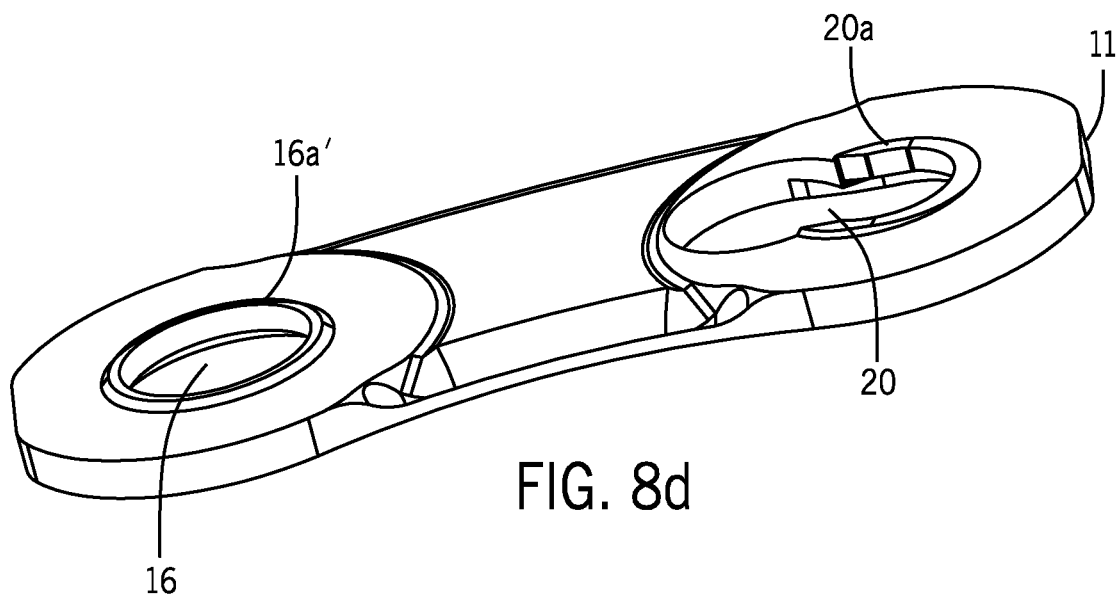

FIG. 7 shows a first embodiment of a closing plate 10. The shape of the closing plate 10 is clearly evident in the plan view in FIG. 7*a*. Thus, the closing plate 10 is of asymmetrical design along its longitudinal axis V. The connecting region 15, which is arranged between the first end region 11 and the second end region 12, is not tapered as in the prior art. The connecting region 15 has a concave peripheral region 14 and a convex peripheral region 13. The plan view also shows the slot 20 and the pin bore 16 with its depression 16*b*. The depression 16*b* creates space for the riveting of the pin foot and accommodates the deformed material of the pin foot. This prevents the situation where the deformed material of the pin foot projects beyond the surface of the closing plate 10 and collides with other parts of the bicycle drive, e.g. during gear change. The recess 15*a* in the connecting region 15 is clearly evident in that side view of the closing plate 10 which is illustrated in FIG. 7*b*. The connecting region 15 is recessed to a marked extents in relation to the two end regions 11, 12. The material thickness of the closing plate 10 in the region of the recess 15*a* is thus smaller than in the end regions 11, 12. The recess 15*a* in the closing plate 10 facilitates the engagement of a tooth, even when the closing plates 10, in the assembled state, are located very closely together. FIG. 7*a* shows the inner side of the closing plate 10. The recess 15*a* is clearly evident here too. The recess 15*a* is delimited by the arcuate end regions 11, 12 and extends as far as the peripheries 13 and 14. This gives a recess 15*a* which is narrower in the region of the longitudinal axis V of the closing plate than at the peripheral regions 13, 14. The transition between the recess 15*a* and the bevels 13*a* and 14*a* is rounded here. There are tangential transitions, in preference to edges, between the recess 15*a* and the bevels 13*a*, 14*a*. The bevels 13*a* and 14*a* along the peripheries further facilitate the tooth penetration. The pin bore 16 has a projection 16a on the inner side of the closing plate 10. Said projection is a result of the depression 16b on the outer side of the closing plate 10, because material is pushed through onto the other side. The projection 16a increases the stability of the plate 10.

The material thickness reduced on account of the recess 15a, and the resulting reduced cross section of the closing plate 10, is compensated for by the modified outer contour of the closing plate 10. The convex periphery 13 enlarges the cross section of the closing plate 10 and thus increases the stability thereof. The closing plate 10 is produced from a planar starting material. The original material thickness can still be found merely in the end regions 11, 12. The connecting region 15 has some of the original material thickness removed, and therefore the recess 15a is created in particular by stamping.

FIGS. 8a-d show a second embodiment of the closing plate 10'. The closing plates 10 and 10' differ merely by way of the enlarged depression 16b' of the pin bore 16 on the outer side and the resulting enlarged projection 16a' on the inner side. The enlarged depression 16b' can accommodate more deformed pin material. The projection 16a' provides yet more stability in the region of the pin bore 16. It is also the case that the slot 20, in this exemplary embodiment, has a projection 20a on the inner side of the closing plate 10'. This projection 20a is also produced by material deformation of the plate 10' and contributes to the stability in the region of the slot 20. The projection 20a slopes down in the direction of the first end region 11 and can be seen particularly clearly in the side view and in the perspective view.

Figure 9A:
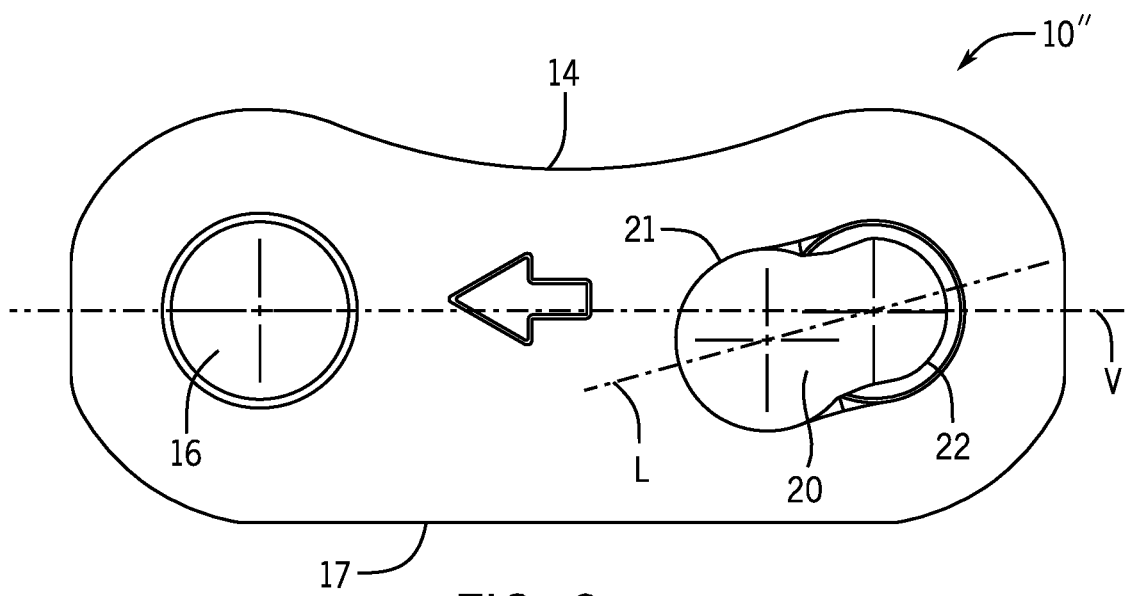
FIG. 9b shows a bottom view of FIG. 9a, FIG. 10a shows a fourth embodiment of the closing plate in plan view.
Figure 9B:
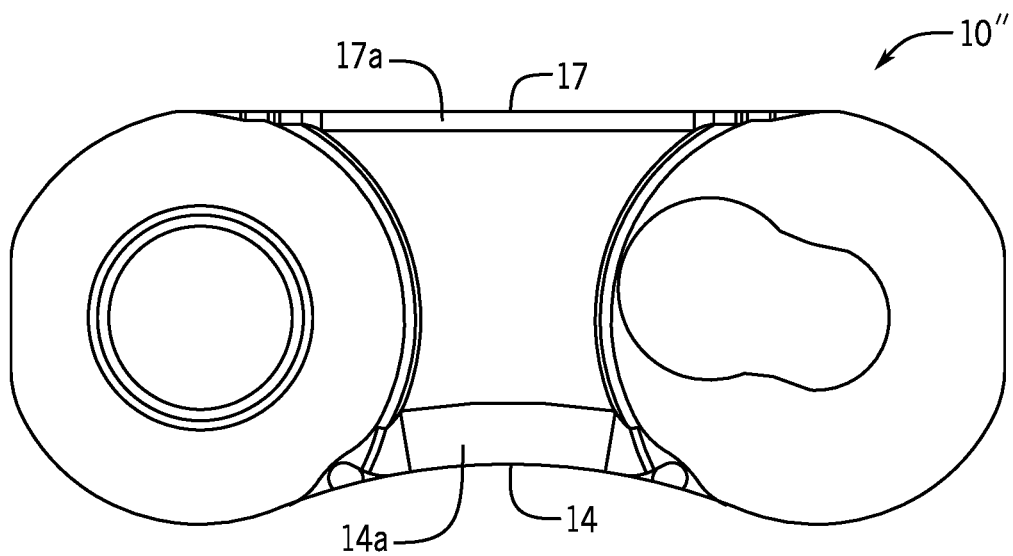

FIG. 9a shows the outer side, and FIG. 9b shows the inner side, of a third embodiment of the closing plate 10". This closing plate 10" differs from the other two on account of its contour. In this case, one peripheral region 14 is of concave design and the other peripheral region 17 is of rectilinear design. The concave peripheral region 14 follows the shape of the rest of the outer link plates and inner link plates and the rectilinear peripheral region 17 is a good compromise between stability and rolling behavior on the upper chain rollers of the rear derailleur. It is also the case that the rectilinear peripheral region 17 has a bevel 17a, which facilitates the engagement of a tooth in the interspace between two mutually opposite closing plates. The bevels 13a, 14a, 17a in all the embodiments form a kind of funnel shape with the largest possible inside width for the engaging teeth.

FIG. 9a also clearly shows the oblique positioning of the slot 20 in relation to the longitudinal axis V of the closing plate. The center points of the two openings 21, 22 are located on the longitudinal axis L of the slot, said longitudinal axis being rotated through approximately 15 degrees in relation to the longitudinal axis V of the closing plate. This orientation of the slot 20 in the closing plate 10 is such that enough material remains around the slot 20 in order to provide the closing plate 10 with sufficient stability and to prevent fatigue fractures.

Figure 10A:
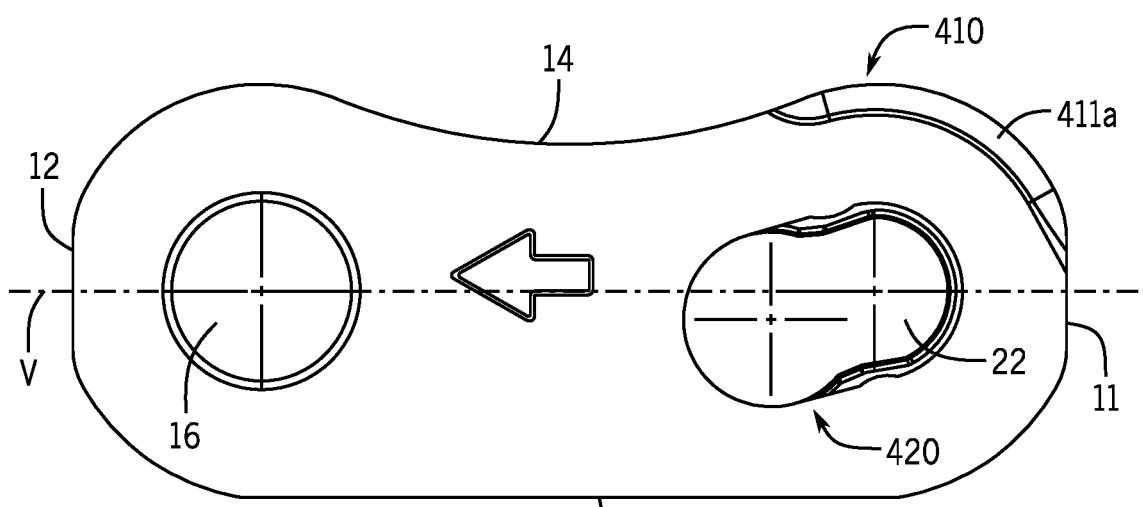
FIG. 10b shows FIG. 10a in a side view.
FIG. 10c shows a bottom view of FIG. 10a, FIG. 10d shows a detail-form view of the slot from FIG. 10a, FIG. 10e shows a perspective plan view of the fourth embodiment.
FIG. 10f shows a perspective bottom view of the fourth embodiment.

FIG. 10a shows a fourth embodiment of the closing plate 410 in plan view. The closing plate 410 likewise has a first and second end region 11, 12, a concave peripheral region 14 and a rectilinear peripheral region 17 running substantially rectilinearly. The pin bore 16 and the slot 420 very substantially correspond to the preceding exemplary embodiments. The various detachment-prevention mechanisms of the fourth embodiment will be discussed in conjunction with FIG. 10d. The longitudinal axis V of the closing plate 410 runs, as in the previous embodiments, through the center points of the pin bore 16 and the retaining opening 22. The rectilinear peripheral region 17 extends parallel to the longitudinal axis V of the closing plate 410. A first bevel 411a is arranged on the outer side, which is visible in plan view, of the closing plate 410. The first bevel 411a improves the shift behavior of the chain in particular in the region between the first end region 11 and the concave peripheral region 14 of the closing plate 410.

Figure 10B:
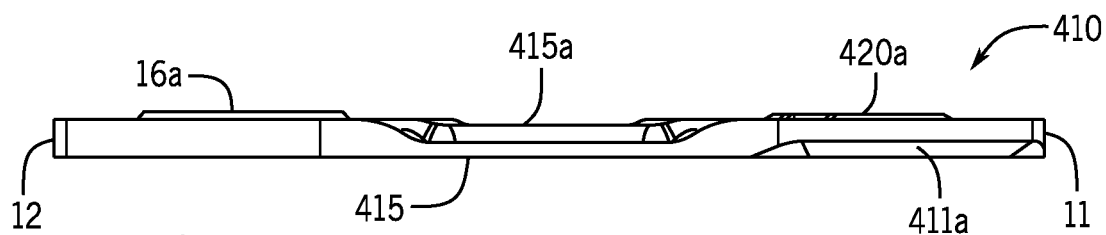

FIG. 10b shows the fourth embodiment in a side view. Both the projection 16a at the pin bore 16 and the projection 420a at the slot 420 are visible here. The connecting region 415, which is recessed in relation to the end regions 11, 12, and the recess 415a can also be seen. The additional material of the projections 16a and 420a results in an increase in the cross section and therefore to greater stability and fracture resistance of the closing plate 410 in the region of the two openings 16, 420.

Figure 10C:
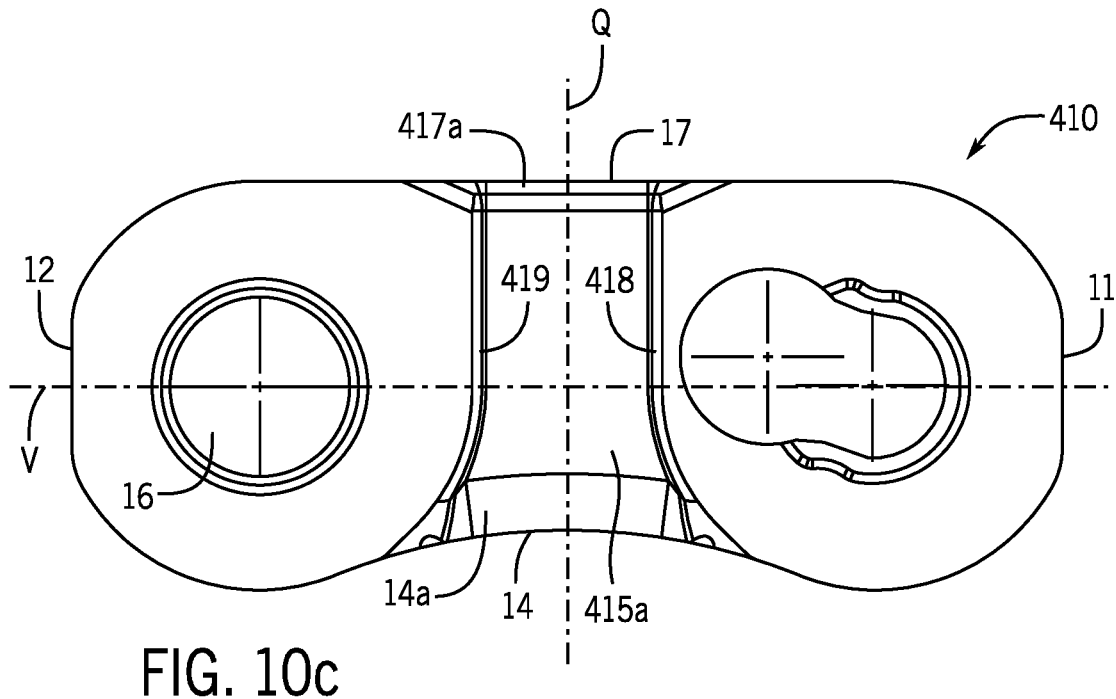

FIG. 10c shows the bottom view of the closing plate 410 and the inner side of the plate 410. The transverse axis Q, running perpendicularly to the longitudinal axis V, of the closing plate 410 is also shown here. Also in this exemplary embodiment, bevels 417a and 14a are provided along the peripheral regions 17 and 14. They facilitate the engagement of a tooth in the interspace between two opposite closing plates. As in the previous exemplary embodiments, the recess 415a is on the one hand bounded by the two end regions 11, 12 and on the other hand extends as far as the peripheral regions 14, 17. However, the profile of the boundaries by the end regions 11, 12 or the first contour 418 of the recess 415a and the second contour 419 of the recess 415a differs from the previous, continuously curved exemplary embodiments.

The first contour 418 and the second contour 419 of the recess 415a run symmetrically with respect to the transverse axis Q. The contours 418, 419 of the recess 415a have a curved, tapering profile from the concave peripheral region 14 towards the centrally positioned longitudinal axis V. From the longitudinal axis V towards the rectilinear peripheral region 17, said contours run substantially rectilinearly, i.e. parallel to the transverse axis Q. The recess 415a is therefore dimensioned to be smaller in the direction of the longitudinal axis V in the region of the rectilinear peripheral region 17 than in the region of the concave peripheral region 14. In addition, the recess 415a is dimensioned to be smaller in the region in the vicinity of the longitudinal axis V than in the region in the vicinity of the concave peripheral region 14. The recess 415a is dimensioned to be approximately the same size in the region of the longitudinal axis V and in the region of the rectilinear peripheral region 17. This has the advantage that more material at the peripheral region 17 results in an increased cross-sectional surface area of the closing plate 410 and in greater stability. In comparison thereto, the cross-sectional surface area of the previous exemplary embodiment is somewhat smaller because of the recess 15a (continuously curved contour of the recess) which increases in the direction of the concave peripheral region 14 and also in the direction of the rectilinear peripheral region 17. The increased cross section of the closing plate 410 because of the reduced recess 415a contributes to compensating for the somewhat reduced cross section of a rectilinear peripheral region 17 in comparison to a convex peripheral region 13 (FIGS. 1a to 8).

The tooth engagement opening of the closing link is therefore dimensioned to be larger at the concave peripheral regions 14 in the longitudinal direction of the closing plates 410 than on the side of the rectilinear peripheral regions 17. In the preceding exemplary embodiments, the recess 15a on the non-concave periphery 13, 17 is dimensioned to be significantly larger than on the concave periphery 14. Nevertheless, the recess 415a which is narrower on the peripheral regions 17 is of a size sufficient to ensure frictionless operation. In the cycling-ready state, the bicycle chain 1 has a closed chain loop, the links of which are in engagement with the teeth of the front chain ring and the sprockets, and the lower and the upper chain rollers of the rear derailleur pass through in an S-shaped curve. The concave peripheral regions 14 of the closing link here point in the direction of the teeth of the chain ring, the sprockets and also of the lower chain roller. Only during the passage of the upper chain roller do the rectilinear peripheral regions 17 and not the concave peripheral regions 14 point in the direction of the teeth of the upper chain roller. The upper chain roller customarily has only one group of thin teeth, the axial width of which is coordinated with the tooth engagement openings of the pairs of inner link plates. The smaller recess 415a of the closing link is therefore always still of a size sufficient in the region of the rectilinear peripheral region 17 in order to be able to receive the teeth of the upper chain roller.

For the same reasons, it would also be conceivable to form the recess only from the concave peripheral region as far as the central region of the longitudinal axis. The remaining region from the longitudinal axis as far as the rectilinear peripheral region would then be free from a recess. This would have the advantage that more material in the region of the rectilinear peripheral region would further increase the cross section and therefore the stability of the closing plate. The tooth engagement opening on the rectilinear peripheral region would still always be of a size sufficient for the upper chain roller.

Figure 10D:
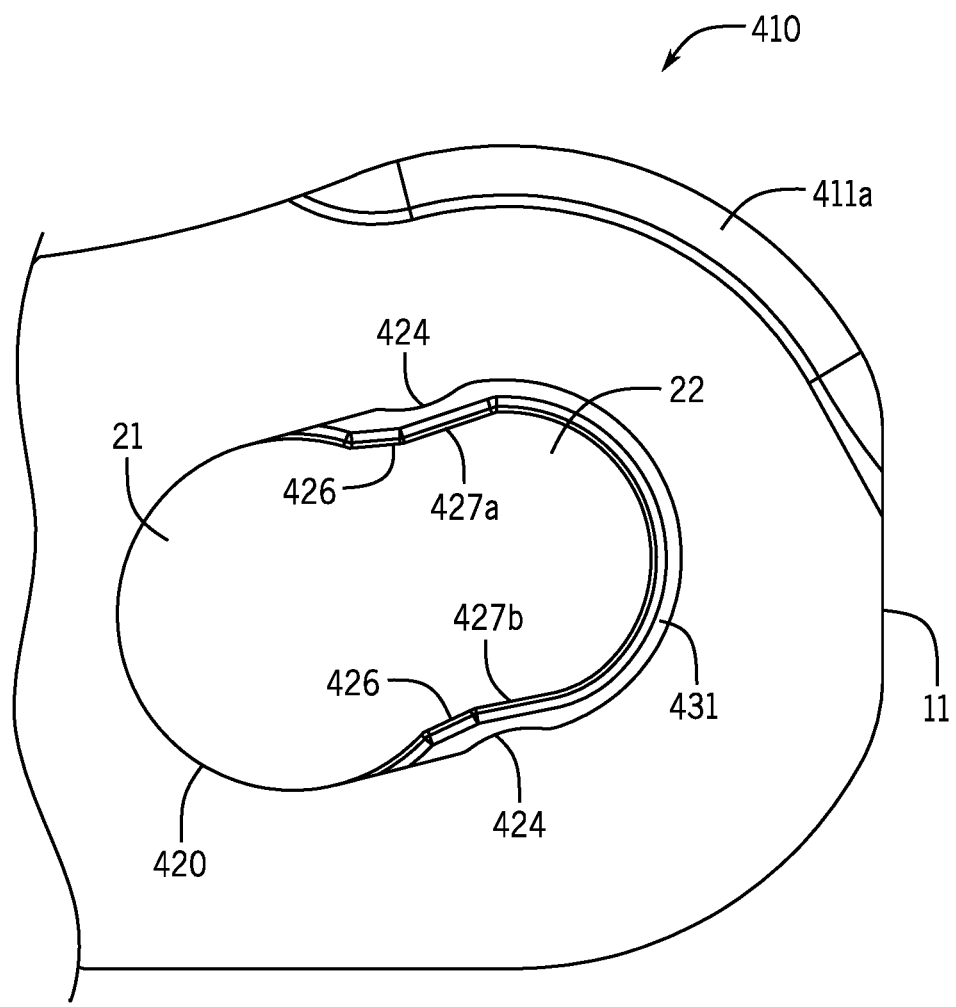

FIG. 10d shows a detail-form view of the slot 420 from FIG. 10a. The various detachment-prevention mechanisms are readily visible here. In principle, the fourth exemplary embodiment follows the previous one insofar as the ratios of the pin diameters, which are described in conjunction with FIGS. 5a and 5b, are correspondingly applicable to the slot openings 21, 22 and to the distances A1, A2 and A3. The closing plate 410 likewise has a narrowed head location 424, a narrowed neck location 426 and an adjoining clamping region 427 with two clamping slopes 427a, 427b. In the case shown, a pin has to pass first of all through the narrowed neck location 426 and subsequently through the narrowed head location 424 during the assembly (displacement of the pin from the insertion opening 21 in the direction of the retaining opening 22). A reverse sequence or arrangement of the narrowed locations would also be conceivable. A consecutive arrangement of the narrowed locations is positive insofar as the forces do not act simultaneously, but rather successively, on pin head and pin neck. However, it would also be possible to arrange the two narrowed locations in such a manner that the latter are passed simultaneously by the pin.

In contrast to the previous embodiments, a ramp as an additional detachment-prevention mechanism is dispensed with here. The base 431 of the depression in the slot 420 therefore runs continuously on one plane. That is to say, during the assembly of the chain-closing link, the lower side of the pin head slides along the base 431 of the depression until the pin has reached its end position in the retaining opening 22. During the assembly, the pin therefore first of all has to negotiate the narrowed neck location 426 and then the narrowed head location 424. Subsequently, the pin is pressed in the clamping region 427 by the two clamping slopes 427a, 427b, which do not run parallel, in the direction of the retaining opening 22 (i.e. in the assembly direction).

Figure 10E:
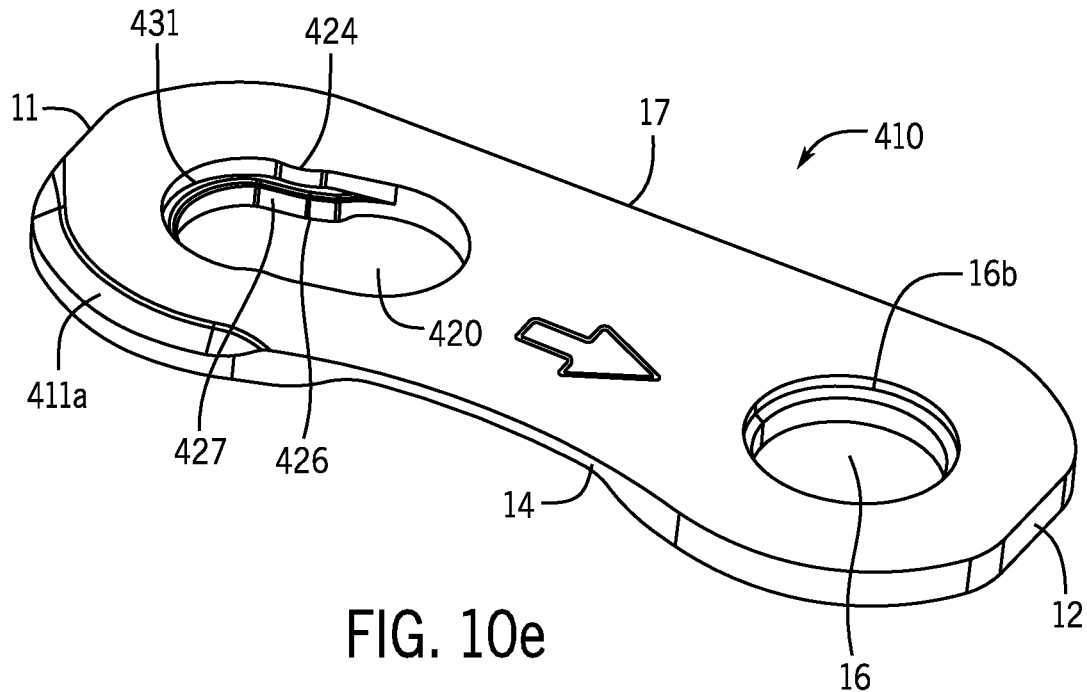
Figure 10F:
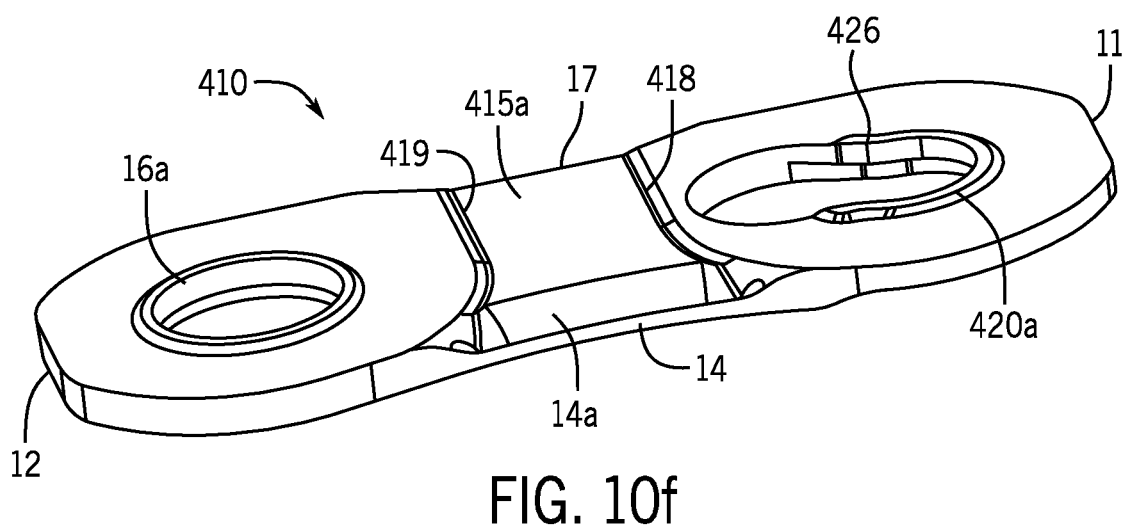

FIGS. 10e and 10f show a perspective plan view and a perspective bottom view of the closing plate 410. The various planes of the closing plate 410 are particularly readily visible in the perspective view. The base 431 of the depression of the slot 420 lies on the outer side (FIG. 10e) of the closing plate 410, and the depression 16b of the pin bore 16 lies at a significantly lower point than the outer surface of the closing plate 410. On the inner side (FIG. 10f) of the closing plate 410, material which has been thrown up in the form of the projection 16a of the pin bore 16 and the projection 420a of the slot 420 is visible. The recess 415a in the connecting region of the closing plate 410 is significantly lowered in relation to the end regions 11, 12. The bevels 411a, 14a and the sequence of the narrowed neck location 426 and narrowed head location 424 can readily also be seen in the perspective view.

Figure 11:
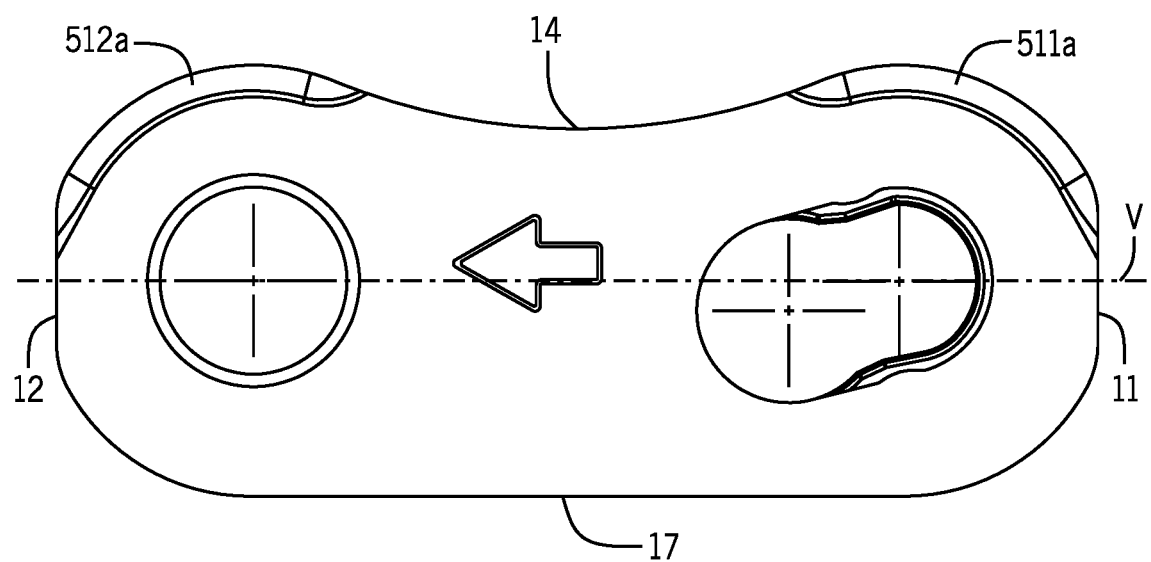
FIG. 11 shows a fifth embodiment of the closing plate in plan view.

FIG. 11 shows a fifth embodiment of the closing plate 510 in plan view. This embodiment differs from the fourth embodiment merely in that the outer side of the closing plate has a second bevel 512a on the second end region 12 in addition to the first bevel 511a on the first end region 11. The two bevels 511a and 512a are arranged in the direction of the concave peripheral region 14 and in the region between the end regions 11, 12 and the concave peripheral region 14. When the chain changes between adjacent sprockets, the bevels 511a, 512a run along the teeth and improve the sliding in and out of the chain.

It would also be conceivable to arrange just one bevel 512a on the first peripheral region 12 and to dispense with the bevel 511a (not illustrated). It would likewise be conceivable to arrange bevels along the outer peripheral regions, for example in the direction of the rectilinear peripheral region 17. In general terms, the chain-closing link in terms of shape and arrangement of the bevels follows the outer link plates as closely as possible. As homogeneous a behavior as possible of the chain is thereby ensured.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. Chain-closing link for a bicycle chain, comprising:
   two closing parts each comprising:
      a closing plate having a first end region, a second end region, a connecting region between the two end regions, and a long hole, the long hole comprising an insertion opening, a retaining opening and a displacement region located between the insertion opening and the retaining opening, is arranged in the first end region of the closing plate, wherein the displacement region narrows from the insertion opening in a direction of the retaining opening and forms a narrowed neck location, and
      a chain pin connected in a rotationally fixed manner to the closing plate, the chain pin having at one end a pin head with a pin neck at one end and has a pin foot at an other end,
   wherein a diameter of the insertion opening is larger than a diameter of the pin head, a diameter of the retaining opening is smaller than the diameter of the pin head and larger than a diameter of the pin neck, and the narrowed neck location is dimensioned to be smaller than the diameter of the pin neck, and wherein a clamping region is arranged between the narrowed neck location and the retaining opening of the long hole and is dimensioned to be smaller than the diameter of the pin neck, such that in an end position the pin would be retained in a play-free manner.

2. Chain-closing link according to claim 1, wherein the clamping region is formed by two clamping slopes which are located opposite one another and run in a non-parallel state in relation to one another.

3. Chain-closing link according to claim 2, wherein in the end position the pin head butts against the two clamping slopes and against a periphery of the long hole.

4. Chain-closing link according to claim 1, wherein the long hole has in its displacement region a ramp, along which the pin head slides by way of its underside when the chain-closing link is being assembled, and the ramp slopes up in the direction of the retaining opening.

5. Chain-closing link according to claim 1, wherein the closing plate is of asymmetrical design relative to its longitudinal axis.

6. Chain-closing link according to claim 5, wherein the connecting region of the closing plate has a concave peripheral region and a less concave or non-concave peripheral region.

7. Chain-closing link according to claim 6, wherein the non-concave peripheral region is designed in the form of a convex peripheral region or in the form of a rectilinear peripheral region.

8. Chain-closing link according to one of claim 5, wherein a longitudinal axis of the long hole runs obliquely in relation to the longitudinal axis of the closing plate.

9. Chain-closing link according to claim 8, wherein the longitudinal axis of the long hole runs at an angle of 5 degrees to 25 degrees in relation to the longitudinal axis of the closing plate.

10. Chain-closing link according to claim 9, wherein the longitudinal axis of the long hole runs at an angle of 15 degrees in relation to the longitudinal axis of the closing plate.

11. Chain-closing link according to one claim 1, wherein the connecting region of the closing plate has a recess.

12. Chain-closing link for a bicycle chain, comprising:
two closing parts each comprising:
a closing plate including a first end region, a second end region, a connecting region between the two end regions, and a slot arranged in the first end region, the connecting region of the closing plate including a concave peripheral region and a non-concave peripheral region, and the slot comprising an insertion opening, a retaining opening and a displacement region located between the insertion opening and the retaining opening, wherein the displacement region narrows from the insertion opening in a direction of the retaining opening and forms a narrowed head location and/or a narrowed neck location, and
a chain pin connected in a rotationally fixed manner to the closing plate, the chain pin having at one end a pin head with a pin neck and at the other end a pin foot,
wherein a diameter of the insertion opening is larger than a diameter of the pin head, a diameter of the retaining opening is smaller than the diameter of the pin head and larger than a diameter of the pin neck, and the narrowed head location is dimensioned to be smaller than the diameter of the pin head and/or the narrowed neck location is dimensioned to be smaller than the diameter of the pin neck, and
wherein the connecting region of the closing plate has a recess.

13. Chain-closing link according to claim 12, wherein the non-concave peripheral region is designed in the form of a convex peripheral region or in the form of a rectilinear peripheral region.

14. Chain-closing link according to claim 12, wherein a longitudinal axis of the slot runs obliquely in relation to the longitudinal axis of the closing plate.

15. Chain-closing link according to claim 14, wherein the longitudinal axis of the slot runs at an angle of 5 degrees to 25 degrees in relation to the longitudinal axis of the closing plate.

16. Chain-closing link according to claim 15, wherein the longitudinal axis of the slot runs at an angle of 15 degrees, in relation to the longitudinal axis of the closing plate.

17. Chain-closing link according to claim 12, wherein a securing region is arranged between the narrowed head location and the retaining opening of the slot and is dimensioned to be smaller than the diameter of the pin head, and/or a securing region is arranged between the narrowed neck location and the retaining opening of the slot and is dimensioned to be smaller than the diameter of the pin neck.

18. Chain-closing link according to claim 17, wherein the securing region is formed by two clamping slopes which are located opposite one another and run in a non-parallel state in relation to one another.

19. Chain-closing link according to claim 12, wherein the slot has in its displacement region a ramp along which the pin head slides by way of its underside when the chain-closing link is being assembled, wherein the ramp slopes up in the direction of the retaining opening.

* * * * *